(12) United States Patent
Kurup et al.

(10) Patent No.: US 11,592,414 B2
(45) Date of Patent: Feb. 28, 2023

(54) ELECTROCHEMICAL SENSOR FOR DETECTION AND QUANTIFICATION OF HEAVY METALS

(71) Applicant: University of Massachusetts, Boston, MA (US)

(72) Inventors: Pradeep Unnikrishnan Kurup, Nashua, NH (US); Susom Dutta, Lowell, MA (US)

(73) Assignee: University of Massachusetts, Boston, MA (US)

( * ) Notice: Subject to any disclaimer, the term of this patent is extended or adjusted under 35 U.S.C. 154(b) by 331 days.

(21) Appl. No.: 16/970,897

(22) PCT Filed: Feb. 27, 2019

(86) PCT No.: PCT/US2019/019730
§ 371 (c)(1),
(2) Date: Aug. 18, 2020

(87) PCT Pub. No.: WO2019/168901
PCT Pub. Date: Sep. 6, 2019

(65) Prior Publication Data
US 2020/0393400 A1    Dec. 17, 2020

Related U.S. Application Data

(60) Provisional application No. 62/635,877, filed on Feb. 27, 2018.

(51) Int. Cl.
*G01N 27/30* (2006.01)
*G01N 27/327* (2006.01)

(52) U.S. Cl.
CPC ....... *G01N 27/308* (2013.01); *G01N 27/3278* (2013.01)

(58) Field of Classification Search
CPC ... G01N 27/308; G01N 27/48; G01N 27/3278
See application file for complete search history.

(56) References Cited

U.S. PATENT DOCUMENTS 3,941,563 A    3/1976 Saltzman
6,090,269 A    7/2000 Mandler et al.
(Continued)

FOREIGN PATENT DOCUMENTS

CN    102253039 A    11/2011
CN    105223244 A    1/2016
(Continued)

OTHER PUBLICATIONS

Wang et al., "Reduced graphene Oxide/Carbon Nanotube/God Nanoparticles Nanocomposite Functionalized Screen-Printed Electrode for Sensitive Electrochemical Detection of Endocrine disruptor Bisphenol A," Electroanalysis 2015, 27, 2527-2536 (Year: 2015).*
(Continued)

*Primary Examiner* — Alexander S Noguerola
(74) *Attorney, Agent, or Firm* — Hamilton. Brook, Smith & Reynolds, P.C.

(57) ABSTRACT

Electrochemical sensors useful for detection of heavy metals are described. The electrochemical sensors can be made by forming a layer of graphene oxide on a working electrode, forming a layer of carbon nanotubes (CNTs) on the layer of graphene oxide, and forming a layer of gold nanostars on the layer of CNTs.

26 Claims, 31 Drawing Sheets

(56) References Cited

U.S. PATENT DOCUMENTS

| | | | |
|---|---|---|---|
| 6,808,931 | B1 | 10/2004 | Wang et al. |
| 8,093,059 | B2 | 1/2012 | Yamauchi |
| 8,715,981 | B2 | 5/2014 | Claussen et al. |
| 8,741,384 | B2 | 6/2014 | Maiorano et al. |
| 9,561,292 | B1 | 2/2017 | Vo-Dinh et al. |
| 10,845,335 | B2 | 11/2020 | Kurup et al. |
| 2013/0209807 | A1 | 8/2013 | Chatterjee |
| 2014/0313636 | A1 | 10/2014 | Tour et al. |
| 2016/0025678 | A1 | 1/2016 | Kurup et al. |
| 2017/0038303 | A1 | 2/2017 | Lee et al. |
| 2018/0246059 | A1 | 8/2018 | Kurup et al. |

FOREIGN PATENT DOCUMENTS

| | | |
|---|---|---|
| CN | 104690265 B | 5/2017 |
| CN | 105665741 B | 10/2017 |
| EP | 2252623 B1 | 12/2013 |
| WO | 2014165659 A2 | 10/2014 |
| WO | 2014186901 A1 | 11/2014 |
| WO | 2015054287 A2 | 4/2015 |
| WO | 2019168901 A1 | 9/2019 |

OTHER PUBLICATIONS

Yuan et al., "Gold nanostars: surfactant-free synthesis, 3D modelling, and two-photon photoluminescence imaging," Nanotechnology 23 (2012) 075102 (9pp) (Year: 2012).*

Rao et al., "Self-assembly preparation of gold nanoparticle decorated 1-pyrenemethylamine functionalized graphene oxide-carbon nanotube composites for highly sensitive detection of nitrite," Anal. Methods, 2016, 8, 4926 (Year: 2016).*

Liu et al., "Voltammetric Detection of Cr(VI) with disposable Screen-Printed Electrode Modified with Gold Nanoparticles," Environ. Sci. Technol. 2007, 41, 8129-8134 (Year: 2007).*

Yu, et al., "Direct electron transfer of glucose oxidase and biosensing for glucose based on PDDA-capped gold nanoparticle modified graphene/multi-walled carbon nanotubes electrode," Biosensors and Bioelectronics, vol. 15, No. 52, pp. 147-152, Feb. 15, 2014.

Kumar, et al., "High-yield synthesis and optical response of gold nanostars," Nanotechnology, vol. 19, No. 1, Nov. 29, 2007.

Wan, et al., "Graphene Nanoplatelets: Electrochemical Properties and Applications for Oxidation of Endocrine-Disrupting Chemicals," Chemistry—A European Journal, vol. 19, No. 10, pp. 3483-3489, Mar. 4, 2013.

Svancara, et al., "Carbon Paste Electrodes Plated with a Gold Film for the Voltammetric Determination of Mercury(II)," Electroanalysis, vol. 9, No. 11, pp. 827-833, Jul. 9, 1997.

Takahashi, et al., "Redox Response of Reduced Graphene Oxide-Modified Glassy Carbon Electrodes to Hydrogen Peroxide and Hydrazine," Materials, vol. 6, No. 5, pp. 1840-1850, 2013.

Abollino, et al., "Determination of Mercury by Anodic Stripping Voltammetry at a Gold Nanoparticle-Modified Glassy Carbon Electrode," An international Journal Devoted to Fundamental and Practical Aspects of Electroanalysis, vol. 20, No. 1, pp. 75-83. Jan. 2008.

Walsh, et al., "Electrochemical characterisation of the porosity and corrosion resistance of electrochemically deposited metal coatings," Surface & Coatings Technology 202, pp. 5092-5102, 2008.

International Search Report and Written Opinion for International Application No. PCT/US2019/19730, titled "Electrochemical Sensor for Detection and Quantification of Heavy Metals," dated May 6, 2019.

International Preliminary Report on Patentability for International Application No. PCT/US2019/019730, entitled "Electrochemical Sensor for Detection and Quantification of Heavy Metals," dated Sep. 3, 2020.

* cited by examiner

ELECTROCHEMICAL SENSOR FOR DETECTION AND QUANTIFICATION OF HEAVY METALS

RELATED APPLICATION

This application is the U.S. National Stage of International Application No. PCT/US2019/019730, filed Feb. 27, 2019, which designated the U.S., published in English, which claims the benefit of U.S. Provisional Application No. 62/635,877, filed on Feb. 27, 2018. The entire teachings of the above applications are incorporated herein by reference.

GOVERNMENT SUPPORT

This invention was made with government support under Grant No. 1543042 from the National Science Foundation. The government has certain rights in the invention.

BACKGROUND

Heavy metals, such as chromium, lead, arsenic, mercury, and selenium, can be toxic and hazardous to human health. Improved sensors for detecting heavy metals are desirable.

SUMMARY

Described herein are electrochemical sensors, which can be used for the detection of heavy metals. The electrochemical sensors can be made by forming a substrate, forming a graphene oxide layer on the substrate, forming carbon nanotubes (CNTs) on the graphene oxide layer, and forming gold nanostars.

Described herein are methods of making an electrochemical sensor. The methods can include providing a substrate that includes a working electrode, a reference electrode, and a counter electrode, forming a layer of graphene oxide on the working electrode, forming a layer of carbon nanotubes (CNTs) on the layer of graphene oxide, and forming a layer of gold nanostars on the layer of CNTs.

In some embodiments, one or more of the layer of graphene oxide, the layer of CNTs, and the layer of gold nanostars is formed by drop casting. In some embodiments, one or more of the layer of graphene oxide, the layer of CNTs, and the layer of gold nanostars is formed by electrodeposition.

In some embodiments, the working electrode includes carbon paste, glassy carbon, gold, platinum, silver, or indium tin oxide (ITO) glass. In some embodiments, the working electrode includes carbon paste.

In some embodiments, about 80% of the gold nanostars have a diameter from about 15 nm to about 55 nm, or from about 20 nm to about 45 nm. In some embodiments, the gold nanostars have spike lengths from about 7 nm to about 33 nm, or from about 10 nm to about 33 nm.

In some embodiments, the methods include forming gold nanostars. The method for forming gold nanostars can include providing a chloroauric acid solution, heating the chloroauric acid solution, cooling the heated chloroauric acid solution, and combining the cooled chloroauric with a buffered base. In some embodiments, forming gold nanostars further includes homogenizing the chloroauric acid solution prior to heating the chloroauric acid solution. In some embodiments, the buffered base includes 4-(2-hydroxyethyl)-1-piperazineethanesulfonic acid (HEPES). In some embodiments, the buffered base comprises sodium hydroxide (NaOH). In some embodiments, the buffered base comprises 4-(2-hydroxyethyl)-1-piperazineethanesulfonic acid (HEPES) and sodium hydroxide (NaOH).

In some embodiments, a solution can have a concentration of gold nanostars from about 0.1 nM to about 1.5 nM, or from about 0.3 nM to about 1.0 nM. In some embodiments, gold nanostars have an electroactive surface area from about 0.05 mm$^2$ to about 0.8 mm$^2$, or from about 0.1 mm$^2$ to about 0.3 mm$^2$.

Described herein are electrochemical sensors. The electrochemical sensors can include a working electrode, a reference electrode, and a counter electrode. The working electrode can include a graphene oxide layer on the working electrode, carbon nanotubes (CNTs) disposed on the graphene oxide layer, and gold nanostars disposed on the CNTs.

In some embodiments, the electrochemical sensors can have a charge transfer resistance from about 0.2 kiloohm (kΩ) to about 1 kiloohm (kΩ). In some embodiments, the electrochemical sensors can have a double layer capacitance from about 2 µF to about 5 µF.

In some embodiments, the working electrode can include carbon paste, glassy carbon, gold, platinum, silver, or indium tin oxide (ITO) glass. In some embodiments, the working electrode include carbon paste. In some embodiments, about 80% of the gold nanostars have a diameter from about 20 nm to about 45 nm. In some embodiments, the gold nanostars have spike lengths from about 10 nm to about 33 nm.

Described herein is a method for detecting a heavy metal in a sample by square wave anodic stripping voltammetry. The method can include depositing an analyte of interest onto a working electrode by applying a reducing potential, stripping the analyte of interest from the working electrode by applying an oxidizing potential, measuring current at the working electrode as a function of time and as a function of the potential between an auxiliary electrode and a reference electrode while stripping the analyte of interest from the working electrode, and varying the potential between the auxiliary electrode and the reference electrode in a square wave pattern with an increasing potential. The working electrode, reference electrode, and counter electrode form an electrochemical sensor as described herein.

Described herein is a method for detecting a heavy metal in a sample by linear sweep voltammetry. The method can include measuring current at a working electrode, and sweeping potential between the working electrode and a reference electrode linearly with time while measuring current at the working electrode. The working electrode, reference electrode, and counter electrode form an electrochemical sensor as described herein. In some embodiments, the linear sweeping is at a scan rate of about 0.05 Vsec$^{-1}$.

In some embodiments, the carbon nanotubes are single-walled carbon nanotubes. In some embodiments, the carbon nanotubes are multi-walled carbon nanotubes For the methods of detection, in some embodiments, the sample is aqueous media, such as subsurface source of water. In some embodiments, the subsurface source of water is tap water, well water, or ground water. In some embodiments, the aqueous media is wastewater. In some embodiments, the sample is a biological fluid, such as blood.

Notably, the sensors described herein can be used to detect heavy metals over a large concentration range.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Sensors for electrochemical detection of metal ions in solution can be formed by a layer-by-layer approach. A graphene oxide (GO) base layer can be formed on a carbon paste substrate of a screen printed electrode. A layer of single walled carbon nanotubes (SWCNTs) can be formed after forming the graphene oxide layer. A layer of gold nanostar (AuNS) can be formed after forming a layer of SWCNTs.

The layers of graphene oxide, SWCNTs, and AuNS can be applied on any conductive surface that can be used for an electrode, such as carbon paste, glassy carbon, gold, platinum, silver, and ITO glass.

Many other electroactive species, including radioactive elements, herbicides, and pesticides, can be detected by the methods described herein. Examples include plutonium, uranium, chromium, lead, arsenic, mercury, selenium, copper, iron, paraquat, and methyl parathion.

The metals can be detected in a many different types of matrices. Some matrices are solid or semi-solid matrices, such as food and soil. Other matrices are aqueous, such as blood, sweat, saliva, urine, and juice (e.g., apple juice, orange juice). Matrix preparation techniques are known in the art. See, e.g., [1-6]. For acidic media, such as orange juice, adjusting the pH may be appropriate.

Synthesis of Gold Nanostars

Figure 29:
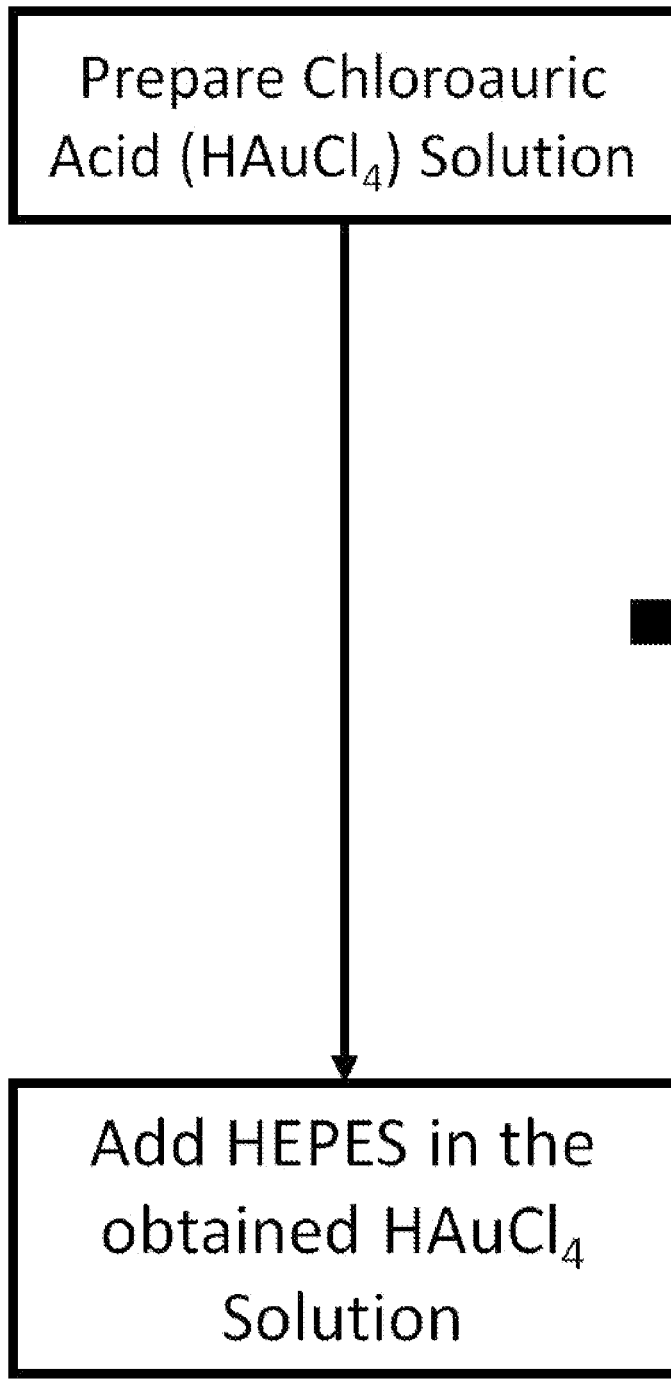
FIG. 29 is a schematic of a method for synthesizing gold nanostars.
Figure 29:
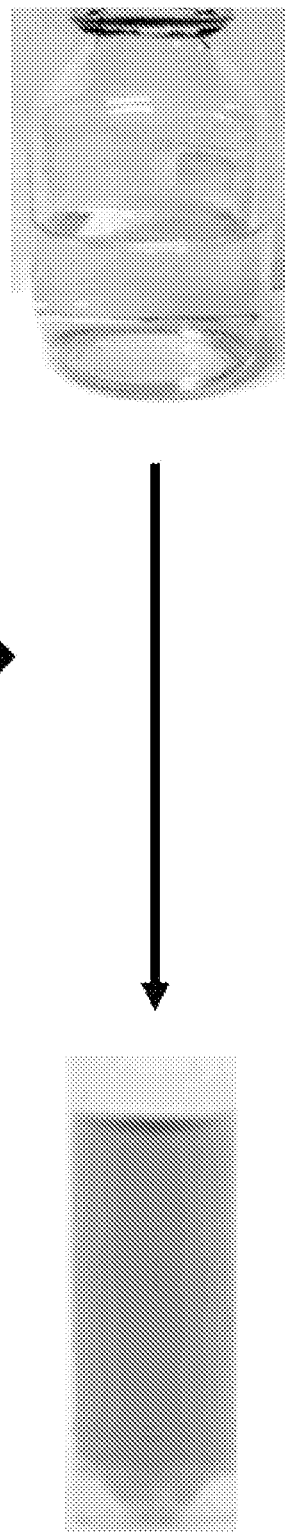
Figure 30:
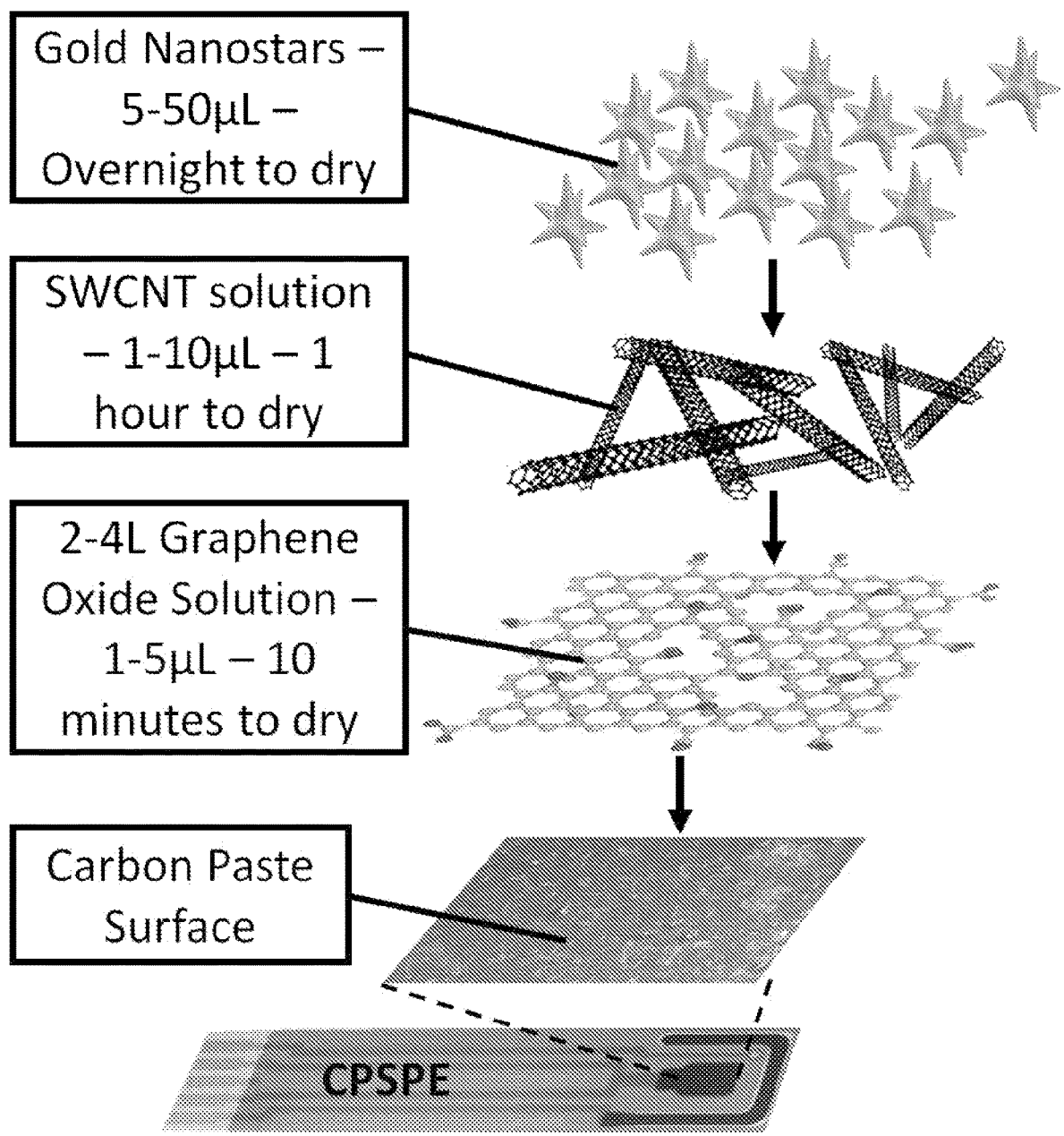
FIG. 30 is a schematic of a method for modifying a sensor or electrode.

FIG. 29 illustrates a process for preparing gold nanostars. A solution of chloroauric acid ($HAuCL_4$) is obtained and, if necessary, diluted. Optionally, the chloroauric acid solution can be homogenized, such as by sonication. The chloroauric acid solution is heated, which can be performed in an oil bath. Typically, the chloroauric acid solution is heated to a range of about 110° C. to about 150° C.; preferably, the chloroauric acid solution is heated to a range of about 120° C. to about 140° C.; even more preferably, the chloroauric acid solution is heated to about 130° C. Heating to these temperatures contributes to spike formation of gold nanostars. The heated chloroauric acid solution is capped and cooled in order to stabilize the solution. Typically, the heated chloroauric acid solution is cooled in a refrigerator to bring the solution to room temperature. The cooled chloroauric acid solution is combined with a buffered base. The buffered base can include 4-(2-hydroxyethyl)-1-piperazineethanesulfonic acid (HEPES), sodium hydroxide (NaOH), or both. Typically, the pH of the buffered base is between 7.1 and 7.7; preferably, the pH of the buffered base is between 7.3 and 7.5. In some instances, the pH of the buffered base is between 7.15 and 7.65. In some instances, the pH of the buffered base is between 7.36 and 7.48. Utilizing a buffered base at these pH values contributes to spike formation of gold nanostars.

As used herein, the term "gold nanostars" refers to gold nanoparticles having spikes extending from the nanoparticles. Nanostars can be measured from transmission electron microscope (TEM) images. Nanostar spikes are measured from the tip of the spike to where the spike connects to the body of the particle. The spikes extending from the gold nanostars typically have a spike length of about 7 nm to about 33 nm, or from about 10 nm to about 33 nm. Nanostar diameter can be determined by first measuring the length of a nanostar at its longest distance, which is typically from the end of one spike to another, and then subtracting out the length of the spikes. Typically, at least about 80% of the gold nanostars have a diameter between about 15 nm and about 55 nm, or from about 20 nm to about 45 nm; in some instances, at least about 80% of the gold nanostars have a diameter between about 30 nm and about 45 nm.

Gold Nanostar Characterization

Gold nanostars can be synthesized by the Good's buffer method, in which the HEPES molecule serves both as a reducing agent and as a growth director. See, e.g., [7]. Ultraviolet-visible (UV-Vis) spectra depict plasmonic peaks of gold nanostars. UV-Vis absorbance spectra of the AuNS solution can be used to estimate the average diameter of inner "sphere" and the end-to-end diameter. For gold nanostars, a large absorbance band at about 700 nm to about 770 nm is associated with the long "spikes," while a small absorbance peak at about 490 nm to about 580 nm is associated with the inner sphere. The broad range of the absorbance bands (700-770 nm or 490-580 nm) results from a range of particle sizes and shapes, ranging from irregularly shaped (non-spherical) particles to quasi-spherical particles. The concentration of gold nanostars can be determined using absorbance values and can be from about 0.1 nM to about 1.5 nM, or from about 0.3 nM to about 1.0 nM. The concentration of gold nanostars is determined by dividing the peak absorbance value ($Abs_{peak}$) from the UV-Vis with the extinction coefficient value (c) obtained from a table corresponding to respective AuNS size published in the literature. See, e.g., [8].

Figure 2:
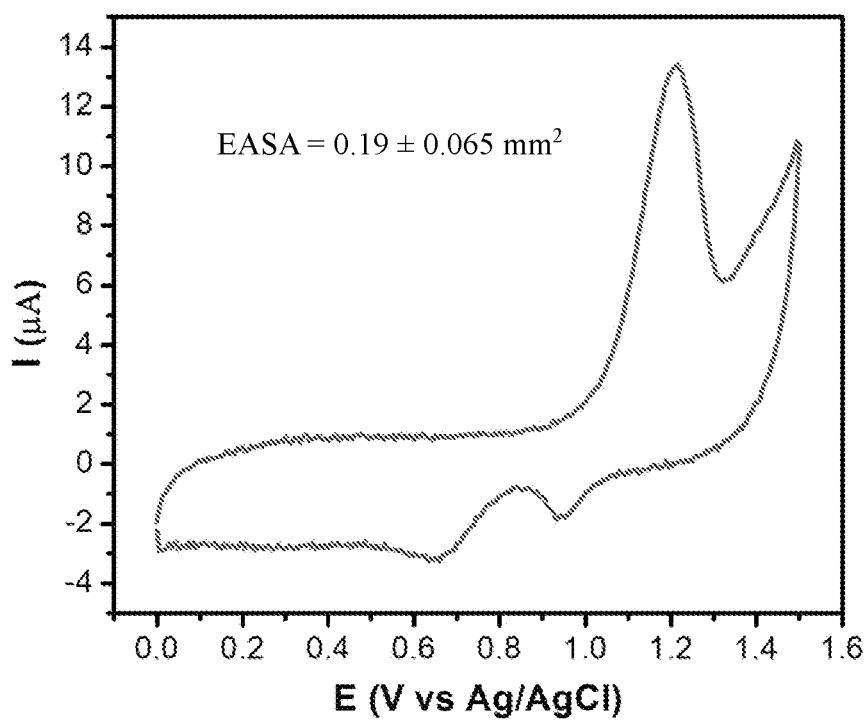
FIG. 2 is a graph showing cyclic voltammetry (CV) on AuNS to determine electroactive surface area.

Electroactive surface area (EASA) can be determined. Cathodic peaks at about 0.95 V are integrated and converted to surface area using a conversion factor reported in literature (450 $\mu C \cdot cm^{-2}$). See, e.g., [9]. The EASA for gold nanostar electrodes can be from about 0.05 $mm^2$ to about 0.8 $mm^2$, or from about 0.1 $mm^2$ to about 0.3 $mm^2$. The electroactive surface area can be used to estimate the relative difference in surface area between the two electrodes. EASA is performed by drop casting 10 µL of AuNS solution on glassy carbon (GC) electrode and conducting cyclic voltammetry in 0.5 M $H_2SO_4$ at a scan rate of 0.1 $Vsec^{-1}$. FIG. 2 depicts the CV corresponding to AuNS, scan 2. The cathodic peaks at 0.95 V were integrated and converted to surface area using a conversion factor reported in literature (450 $\mu C \cdot cm^{-2}$). The EASA for AuNS electrodes was found to be 0.19±0.065 $mm^2$. See, e.g., [9].

Electrode Formation

The electrodes described herein are typically formed by a layer-by-layer process. Commercially-available screen printed electrodes have a working electrode, a reference electrode, and a counter (auxiliary) electrode. Some commercially available screen printed electrodes already have a layer of carbon paste, but if not, a layer of carbon paste can be formed on a commercially-available screen printed electrode.

A layer of graphene oxide can be formed on to the working electrode. After the graphene oxide layer dries, a layer of single walled carbon nanotubes (SWCNTs) can be formed on to the working electrode. After the SWCNT layer dries, a layer of gold nanostars can be formed on to the working electrode.

The layers can be formed by drop casting. Typically, drop casting involves using a pipette to form a bubble of liquid on top of a surface, or particular portion of a surface, and allowing the solvent to evaporate. For the procedures described herein, the amounts of liquid ranges from about 1 µL to about 50 µL. Each layer is allowed to dry before drop casting the next layer. Drying time can vary, but can range from minutes (e.g., for a graphene oxide layer) to several hours (e.g., for a gold nanostar layer).

The layers can be formed by electrodeposition. Typically, electrodeposition involves immersing a screen printed electrode in graphene oxide, SWCNT, and AuNS solution and performing cyclic voltammetry at a scan rate ranging from 0.01 $Vsec^{-1}$ to about 0.25 $Vsec^{-1}$ over a defined potential range of −1.5 V to 0 V up to an optimized range of 40 segments (cycles). Additional information regarding electrodepositions methods are described in [10-11].

Electrode Characterization

The behavior of bare and AuNS-modified electrodes can be investigated in the presence of a redox mediator via electrochemical impedance spectroscopy (EIS). EIS measurements are performed by conducting cyclic voltammetry on AuNS-modified CPSPE in 20 mM hexacyanoferrate(II)/hexacyanoferrate(III) with 100 mM KCl at a scan rate of 0.02 Vsec$^{-1}$ that is used to estimate the electron transfer process. CVs were obtained for each CPSPE to account for midpoint potential shifts attributed to the onboard reference electrode. Nyquist plots were obtained by applying the midpoint potential (obtained via CV) with an amplitude of 0.01 V and a frequency range of 0.001-10 kHz with a total of 30 data points. The quasi-semicircle was extrapolated to the Z' axis to determine the charge transfer resistance ($R_{CT}$) and double layer capacitance ($C_{DL}$) using Zview® software. Additional information regarding EIS are described in [12].

Detection of Metal Ions

The sensors described herein can be used to detect metal ions in solution through electrochemical techniques, such as cyclic voltammetry, square wave anodic stripping voltammetry, linear sweep voltammetry, amperometric detection, potentiometric detection, and cathodic stripping. Below is a description of techniques.

Voltammetry: One of the most common electroanalytical techniques for analysis of metals is voltammetry. In voltammetric analysis, the potential at a system of electrodes is controlled and the resulting currents are measured. The setup consists of an electrochemical cell containing the sample, a working electrode, a reference electrode based on the Ag/AgCl system, and an auxiliary electrode. As the potential at the working electrode is varied with time using a potentiostat, electroactive species within the aqueous solution become oxidized or reduced at specific potentials. Electron transfer associated with this process induces a current that is proportional to the concentration of the species. Thus voltammetry allows both identification of electroactive species in solution based on the peak potential, and concentration prediction based on peak current.

Cyclic Voltammetry (CV): An electrochemical technique which measures the current that develops in an electrochemical cell under conditions where voltage is in excess of that predicted by the Nernst equation. CV is performed by cycling the potential of a working electrode, and measuring the resulting current.

Square Wave Anodic Stripping Voltammetry (SWASV): An electrochemical technique where the analyte (electroactive species) of interest is first deposited onto the working electrode before being removed or 'stripped' by applying an oxidizing potential. During the stripping process, the current at the working electrode is measured as a function of time and as a function of the potential between the auxiliary and reference electrodes. The potential is varied in a square wave pattern with an increasing baseline. The current is sampled at the end of each half period. The difference between the two current readings recorded over each period is taken as the final signal. This method minimizes baseline currents and amplifies the responses from reversible reactions, such as redox reactions. SWASV has been employed to detect lead, arsenic, mercury and selenium using AuNS-SWCNTs-GO, AuNS-SWCNTs, and AuNS modified CPSPE. SWASV parameters have been optimized for each metal analyte present in the solution individually or in the combined form (Example 8). Peak current for each metal analyte occurs at a specific potential (e.g., Lead: −0.2V, Arsenic: 0.05V, Mercury: 0.42V, Selenium: 0.63V), which helps in identifying the type of metal analyte. Peak height (i.e., the height of peak current for the baseline) correlates with analyte concentration.

Linear Sweep Voltammetry (LSV): An electrochemical technique where the current at a working electrode is measured while the potential between the working electrode and a reference electrode is swept linearly in time. Oxidation or reduction of species is registered as a peak or trough in the current signal at the potential at which the species begins to be oxidized or reduced. LSV has been employed to detect hexavalent chromium using AuNS-SWCNTs-GO modified CPSPE. LSV parameters especially the scan rate has been optimized for detecting chromium (VI) in the solution (Example 8). In this case, the current is swept linearly in reverse direction which results an inverted peak with negative current output. Peak current for Cr(VI) typically occurs between −0.3V to 0.3V depending on the concentration and the current value yields the concentration value.

Heavy metal detection using the sensors described herein can be performed in numerous sources of aqueous media, including subsurface sources of water, such as tap water, well water, and ground water; wastewater; and biological fluids, such as blood.

EXEMPLIFICATION

Example 1: Synthesis of Gold Nanostars

FIG. 29 is an overview of a process for synthesizing gold nanostars. 30 µL of chloroauric acid stock solution (30% weight in diluted HCl, purchased from Sigma Aldrich) was diluted to 5 mL using deionized water in a 20 mL glass vial. The diluted chloroauric acid solution was sonicated for 2 minutes to homogenize the solution. An oil bath was heated using a hotplate, set to 5.5. The oil bath was heated to a constant temperature of 160° C. The diluted chloroauric acid solution was placed in the oil bath and was heated for 10 minutes. The oil bath temperature decreased to 130° C. during the heating process, due to heat absorbed by the chloroauric acid solution. After heating, the chloroauric acid solution was capped and placed in the refrigerator to cool for 300 seconds. The refrigerator had a constant temperature of 8° C. 476.6 mg of HEPES buffer was weighed and placed in a 100 mL beaker. 49.9 mL of water was added to bring the HEPES buffer solution to the required volume and 100 µL of 10 M sodium hydroxide was added to adjust the pH to 7.45. The HEPES buffer solution was sonicated for 2 minutes to dissolve any remaining HEPES crystals. 500 µL of chloroauric acid solution was added to the HEPES buffer solution. The solution was then gently stirred. After stirring, the solution was left undisturbed while the nanostars formed. After the reaction was complete (approximately 20 minutes), the solution was covered and placed in the refrigerator. The final volume of nanostars obtained is 50 ml.

Figure 33:
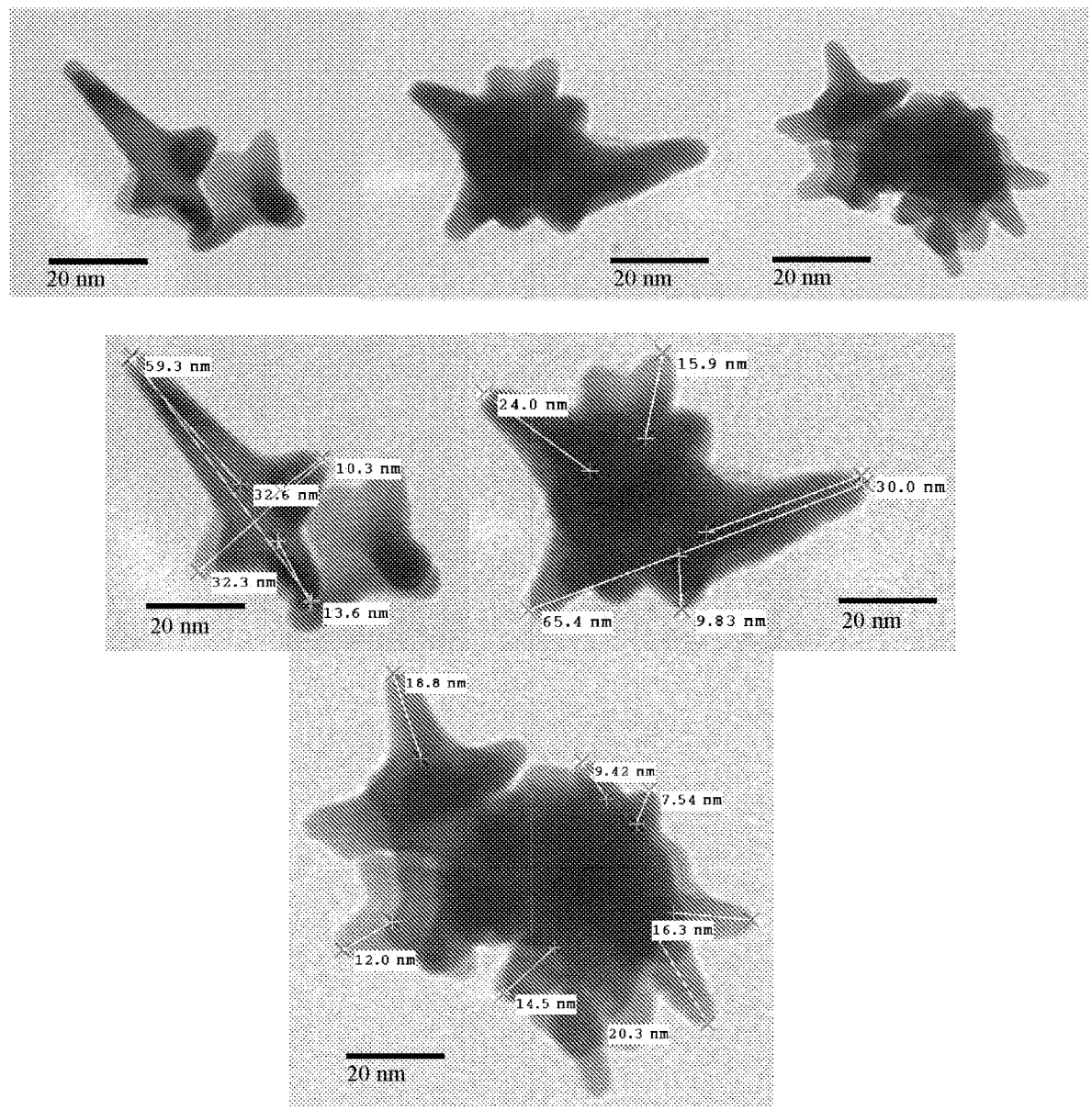
FIG. 33 is representative transmission electron microscope (TEM) images of gold nanostars.

FIG. 33 shows representative images obtained with a transmission electron microscope (TEM) of gold nanostars having an average diameter of about 41 nm with an average spike length of 16 nm. AuNS depicted in these TEM images are obtained from the above synthesis process.

Example 2: Characterization of Gold Nanostars

Figure 1:
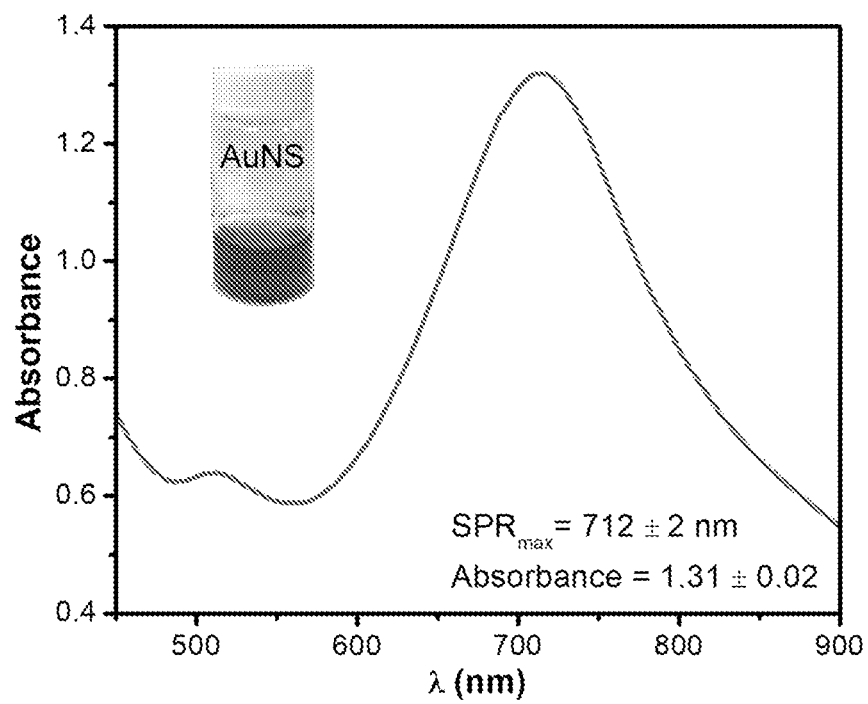
FIG. 1 is a graph showing ultraviolet-visible (UV-Vis) spectroscopy of a solution with AuNS.

Gold nanostars were synthesized according to Example 1. FIG. 1 is a UV-Vis absorbance spectrum depicting plasmonic peaks of gold nanostars in solution. Using the UV-Vis absorbance spectrum of the solution of AuNS, the estimated average diameter of inner "spheres," is 16±6 nm, and the estimated average end-to-end diameter is 41±11 nm. For the AuNS, the large absorbance band at 712 nm is associated with the long "spikes," while the small absorbance peak at 515 nm is associated with the inner sphere. The broad aspect of the absorbance bands at 515 nm and 712 nm results from a range of particle sizes and shapes, ranging from irregularly shaped (non-spherical) particles to quasi-spherical particles. The concentration of AuNS was determined using absorbance values and found to be 0.65±0.015 nM. The concentration is determined by dividing the peak absorbance value ($Abs_{peak}$) from the UV-Vis with the extinction coefficient value (c) obtained from the table corresponding to respective AuNS size published in the literature. See, e.g., [8]. According to previously published literature, the average geometric surface area of the AuNS that corresponded with a given absorbance band was estimated to be 2400±26 $nm^2$, a value that is based on one projected AuNS shape and diameter. See, e.g., [8].

Given that the geometric surface area is an estimated value that relies on one assumed particle shape and does not reflect the percentage of electrochemically active area, the EASA was determined to estimate the relative difference in surface area between the two electrodes. EASA is performed by drop casting 10 μL of AuNS solution on glassy carbon (GC) electrode and conducting cyclic voltammetry in 0.5 M $H_2SO_4$ at a scan rate of 0.1 $Vsec^{-1}$. FIG. 2 depicts the CV corresponding to AuNS, scan 2. The cathodic peaks at 0.95 V were integrated and converted to surface area using a conversion factor reported in literature (450 $\mu C \cdot cm^{-2}$). The EASA for AuNS electrodes was found to be 0.19±0.065 $mm^2$. See, e.g., [9].

Example 3: Formation of Mixed AuNS-SWCNTs-GO Modified Electrode 1-5 μL of graphene oxide solution, 1-10 μL of SWCNTs solution, and 5-50 μL of the solution of gold nanostars of Example 1 were mixed in a glass vial and left for a while to achieve equilibrium. The resultant solution was drop casted on the CPSPE and allowed to dry overnight.

Example 4: Formation of AuNS-SWCNTs-GO Modified Electrode

Carbon paste screen printed electrodes (PINE Research Instrumentation, Inc., Durham, N.C. 27705, United States of America; Product No.: RRPE1002C) were thoroughly rinsed with deionized water and allowed to air-dry. 1-5 μL of final graphene oxide solution obtained was drop casted on carbon paste of CPSPE and allowed to dry for 10 minutes. Once the GO layer formed, 1-10 μL of resultant SWCNTs solution was drop casted and allowed to dry for 1 hour. Finally, 5-50 μL of freshly prepared solution of gold nanostars of Example 1 was drop casted on SWCNTs—GO doped CPSPE and allowed to dry overnight. See FIG. 3O.

Example 5: Formation of AuNS-SWCNTs Modified Electrode

The CPSPEs were thoroughly rinsed with deionized water and allowed to air-dry. 1-10 μL of resultant SWCNTs solution was drop casted and allowed to dry for 1 hour. Finally, 5-50 μL of freshly prepared solution of gold nanostars of Example 1 was drop casted on SWCNTs doped CPSPE and allowed to dry overnight.

Example 6: Formation of AuNS Modified Electrode

The CPSPEs were thoroughly rinsed with deionized water and allowed to air-dry. 5-50 μL of freshly prepared solution of gold nanostars of Example 1 was drop casted on CPSPE and allowed to dry overnight. Graphene oxide and SWCNTs were not used.

Example 7: Electrode Characterization of AuNS Modified Electrode

Figure 3A:
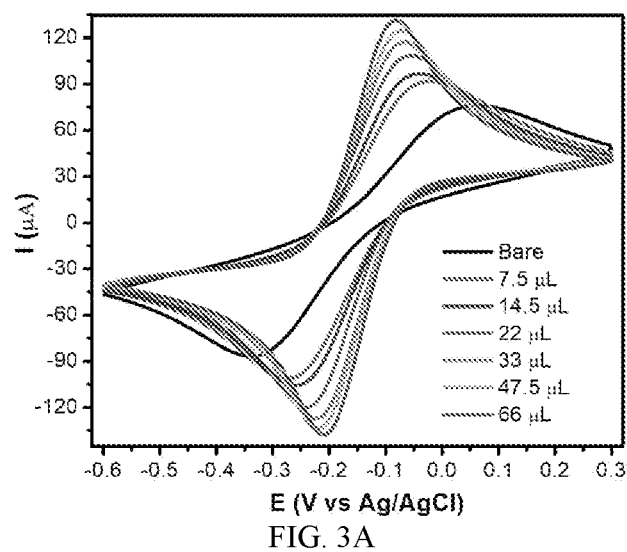
FIGS. 3A, 3B and 3C are graphs showing an impedance study of AuNS enhanced CPSPE sensor with CV plots, Nyquist plots, and charge transfer resistance plot, respectively.
Figure 3B:
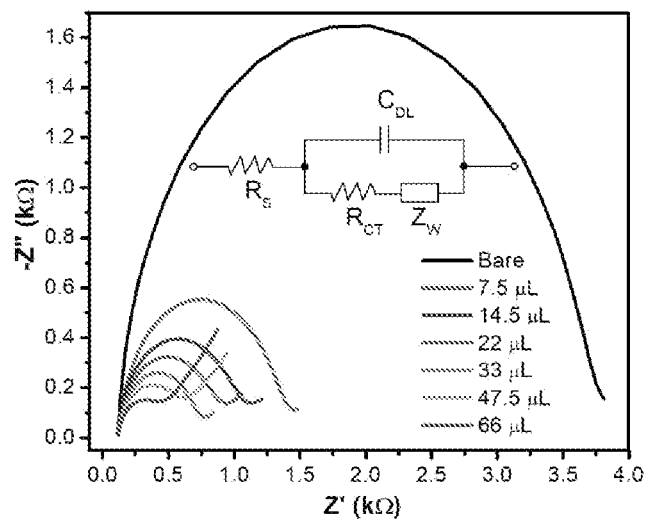
Figure 3C:
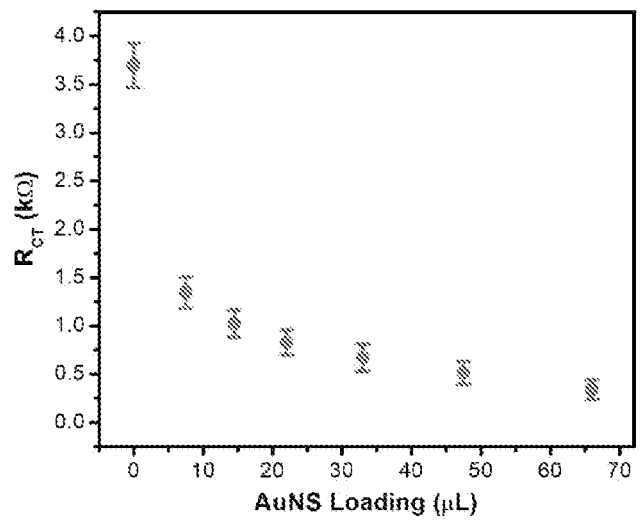

The behavior of bare and AuNS-modified electrodes in the presence of a redox mediator was investigated via electrochemical impedance spectroscopy. CPSPE were modified with a range of AuNS loading (0 μL-66 μL). FIG. 3A depicts CVs obtained on the bare and CPSPE modified with 7.5, 14.5, 22, 33, 47.5 and 66 μL AuNS loading respectively. As the AuNS loading increased, the peak current increased and peak-to-peak separation decreased, indicating enhanced electron transfer processes. For example, peak-to-peak separation for 7.5 μL and 66 μL AuNS loading were 0.253 and 0.128 V respectively, indicating the electron transfer process is more efficient on the CPSPE modified with 66 μL AuNS loading. Nyquist plots were obtained and used to determine $R_{CT}$, FIG. 3B. The Randles circuit was used to interpret the impedance spectra. Resistance associated with the electrolyte, $R_s$, remained unchanged for all the combinations. $R_{CT}$ associated with bare CPSPE and CPSPE modified with a range of AuNS loading was calculated and plotted as shown in FIG. 3C. $R_{CT}$ associated with bare CPSPE was found to be 3.7 kΩ and decreased significantly with increase in AuNS loading. Moreover, double-layer capacitance, $C_{DL}$, and Warburg impedance component, $Z_W$ (within the applied frequency range), was found to be higher for CPSPE modified with 66 μL AuNS loading. The differences observed in $R_{CT}$ and $C_{DL}$ can be attributed to the higher surface area associated with the modification of CPSPE that increases the probability of electron transfer.

Example 8: Protocol for Testing Sensors

The sensors were used to detect known concentrations of metal ions by immersing the sensor into test samples containing the metal ions. The protocols for detecting metal ions in solution are as follows.

For testing solutions with hexavalent Chromium (Cr(VI)): 0.1M $H_2SO_4$ is added as a reagent in the test solution. The test is conducted using linear sweep voltammetry with following parameters: Initial Potential: 0.7 V, Final Potential: −0.8 V, Scan rate: 0.05 $Vsec^{-1}$.

For testing solutions with selenium: 0.1 M $H_2SO_4$ or 0.1 M $HClO_4$ is added as a reagent in the test solution. The test is conducted using square wave anodic stripping voltammetry with following parameters: deposition voltage: −0.5 V, deposition time: 120 sec, Initial Potential: −0.5 V, Final Potential: 1.5 V, Amplitude: 75 mV, Period: 20 msec, Increment: 10 mV, Sampling Width: 5 msec.

For testing solutions with copper: 0.1 M HCl is added as a reagent in the test solution. The test is conducted using square wave anodic stripping voltammetry with following parameters: deposition voltage: −0.4 V, deposition time: 60 sec, Initial Potential: −0.4 V, Final Potential: 1.0 V, Amplitude: 75 mV, Period: 20 msec, Increment: 10 mV, Sampling Width: 5 msec.

For testing solutions with arsenic: 0.1M HCl is added as a reagent in the test solution. The test is conducted using square wave anodic stripping voltammetry with following parameters: deposition voltage: −0.4 V, deposition time: 30 sec, Initial Potential: −0.4 V, Final Potential: 1.0 V, Amplitude: 75 mV, Period: 20 msec, Increment: 10 mV, Sampling Width: 5 msec.

For testing solutions with mercury: 0.01M HCl is added as a reagent in the test solution. The test is conducted using square wave anodic stripping voltammetry with following parameters: deposition voltage: −0.4 V, deposition time: 300 sec, Initial Potential: −0.4 V, Final Potential: 1.0 V, Amplitude: 75 mV, Period: 20 msec, Increment: 10 mV, Sampling Width: 5 msec.

For testing solutions with lead: 0.1 M HCl is added as a reagent in the test solution. The test is conducted using square wave anodic stripping voltammetry with following parameters: deposition voltage: −0.6 V, deposition time: 180 sec, Initial Potential: −0.6 V, Final Potential: 1.0 V, Amplitude: 70 mV, Period: 20 msec, Increment: 11 mV, Sampling Width: 5 msec.

For testing solutions with lead, arsenic and mercury simultaneously: 0.1 M HCl is added as a reagent in the test solution. The test is conducted using square wave anodic stripping voltammetry with following parameters: deposition voltage: −0.6 V, deposition time: 120 sec, Initial Potential: −0.6 V, Final Potential: 1.0 V, Amplitude: 70 mV, Period: 20 msec, Increment: 11 mV, Sampling Width: 5 msec.

Figure 4A:
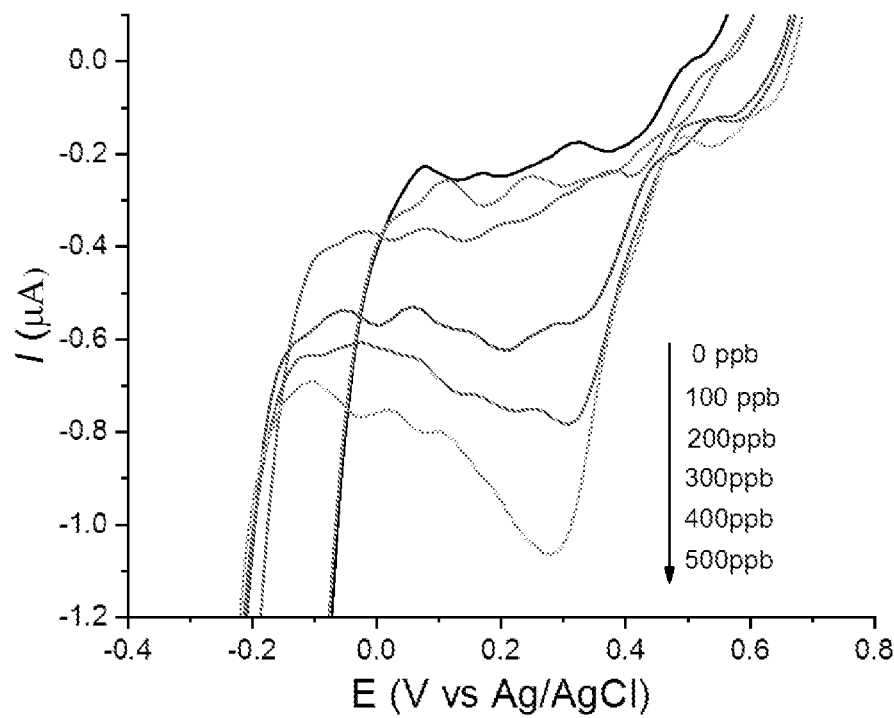
FIGS. 4A and 4B are graphs showing detection of hexavalent chromium (Cr(VI)) by the AuNS-SWCNTs-GO (mixed together and then drop casted on carbon paste) enhanced carbon paste screen printed electrode CPSPE sensor.
Figure 4B:
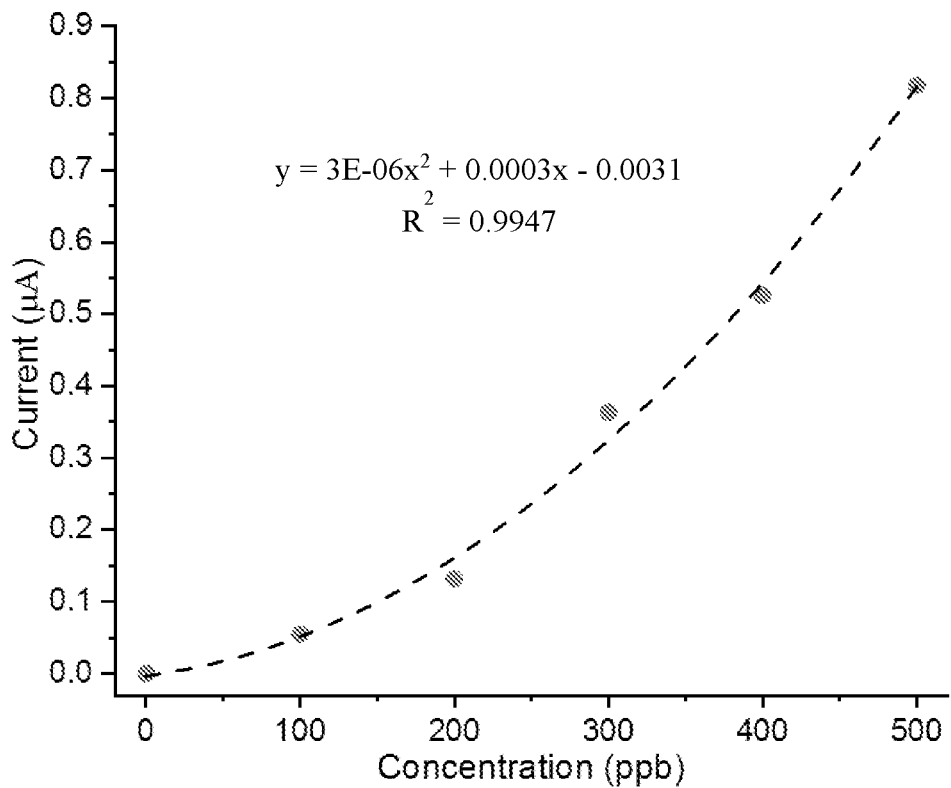

Example 9: Detection of Hexavalent Chromium (Cr(VI)) by the AuNS-SWCNTs-GO (Mixed Together and then Drop Casted on Carbon Paste) Enhanced CPSPE Sensor Cr(VI) solutions of known concentrations (0, 100, 200, 300, 400, 500 ppb) were prepared in water. The solution was tested according to Example 8 using the AuNS-SWCNTs-GO enhanced CPSPE sensor of Example 3 in 0.1 M $H_2SO_4$. The resultant solution was drop casted on the CPSPE. LSV parameters used: Initial Potential: 0.7 V, Final Potential: −0.8 V, Scan rate: 0.05 Vsec$^{-1}$. Results obtained are non-linear for this range of concentrations. FIG. 4A is a graph of mixed AuNS-SWCNTs-GO enhanced CPSPE sensor for detection of hexavalent chromium (Cr(VI)), and FIG. 4B is a calibration curve based on FIG. 4A. These results demonstrate detection over a large concentration range. For comparison, see the results of Example 18.

Figure 5:
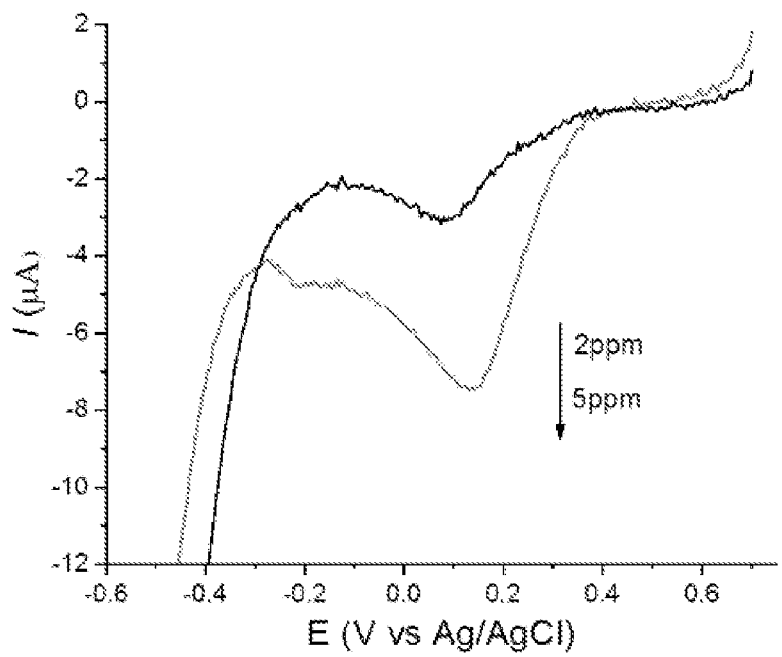
FIG. 5 is a graph showing detection of hexavalent chromium (Cr(VI)) by the AuNS enhanced CPSPE sensor.
Figure 6:
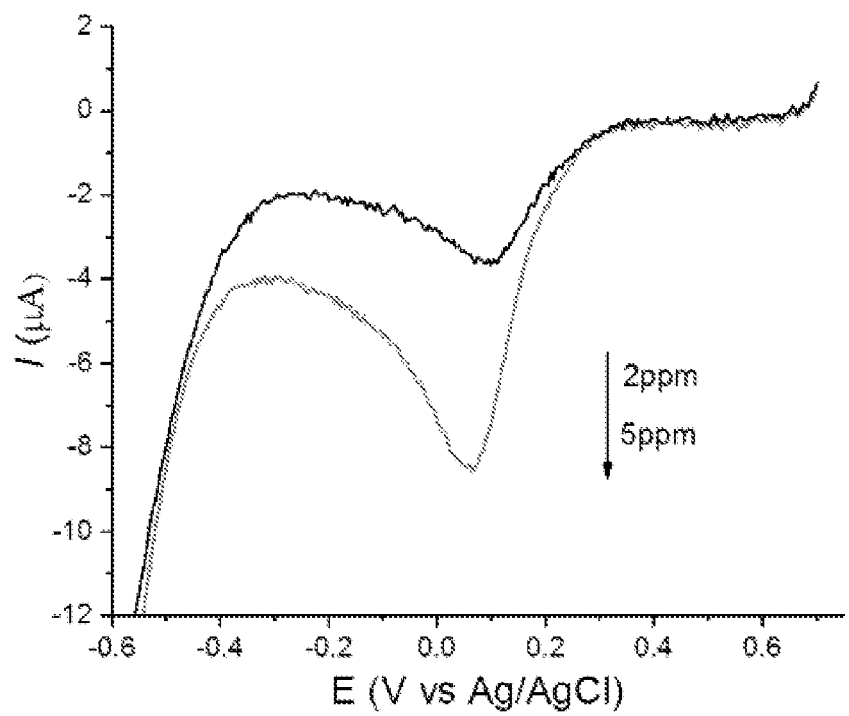
FIG. 6 is a graph showing detection of hexavalent chromium (Cr(VI)) by the AuNS-SWCNTs (layer by layer drop casted on carbon paste) enhanced CPSPE sensor.
Figure 7:
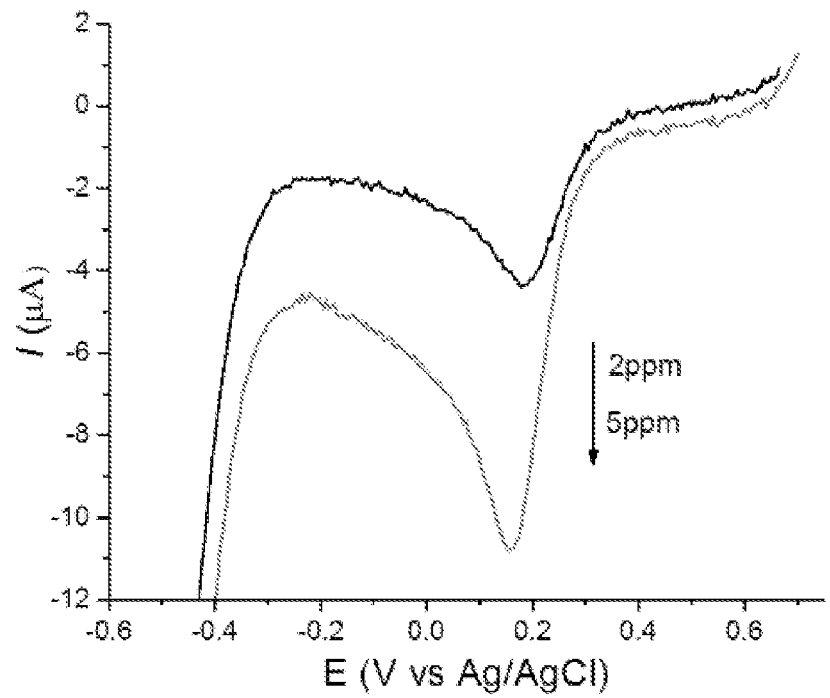
FIG. 7 is a graph showing detection of hexavalent chromium (Cr(VI)) by AuNS-SWCNTs-GO (layer by layer drop casted on carbon paste) enhanced CPSPE sensor.
Figure 8:
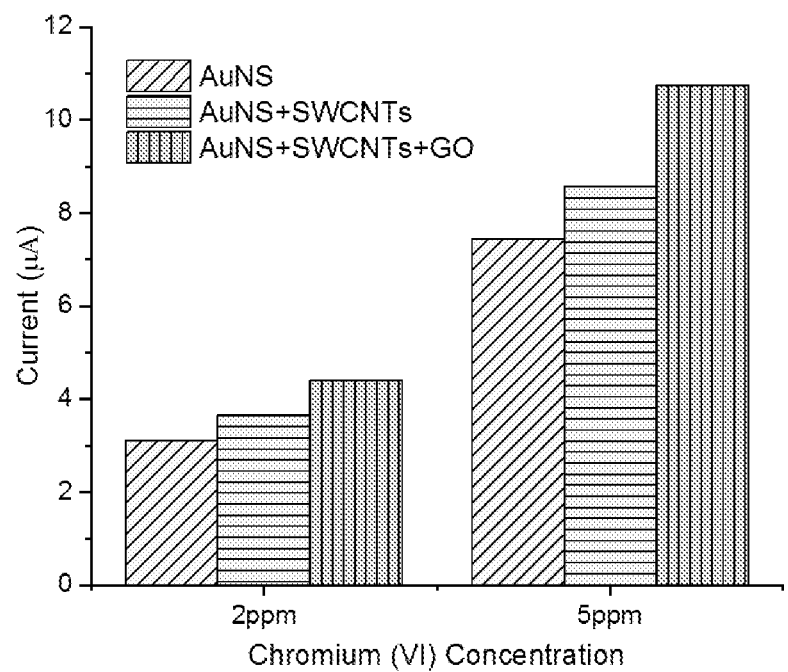
FIG. 8 is a chart comparing results for detection of hexavalent chromium (Cr(VI)) by the AuNS alone, AuNS-SWCNTs (layer by layer drop casted on carbon paste) and AuNS-SWCNTs-GO (layer by layer drop casted on carbon paste) enhanced CPSPE sensor.

Example 10. Comparison of Results for Detection of Hexavalent Chromium (Cr(VI)) by the AuNS Alone, AuNS-SWCNTs (Layer by Layer Drop Casted on Carbon Paste) and AuNS-SWCNTs-GO (Layer by Layer Drop Casted on Carbon Paste) Enhanced CPSPE Sensor Cr(VI) solutions of known concentrations (2 and 5 ppm) were prepared in water. Three varieties of sensors were made: i) AuNS drop casted on CPSPE, ii) SWCNTs and AuNS drop casted layer-by-layer on CPSPE, with SWCNTs drop casted prior to AuNS; and iii) GO, SWCNTs and AuNS drop casted layer by layer on CPSPE. The solution was tested according to Example 8 using these sensors in 0.1 M $H_2SO_4$. LSV parameters used: Initial Potential: 0.7 V, Final Potential: −0.8 V, Scan rate: 0.05 Vsec$^{-1}$. FIGS. 5-7 are graphs showing detection of hexavalent chromium (Cr(VI)) using these above sensors. FIG. 5 is the graph for AuNS drop casted on CPSPE. FIG. 6 is the graph for SWCNTs and AuNS drop casted layer-by-layer on CPSPE, with SWCNTs drop casted prior to AuNS. FIG. 7 is the graph for GO, SWCNTs and AuNS drop casted layer by layer on CPSPE. FIG. 8 is a chart comparing the results for detection of hexavalent chromium (Cr(VI)) by the AuNS alone, AuNS-SWCNTs (layer by layer drop casted on carbon paste) and AuNS-SWCNTs-GO (layer by layer drop casted on carbon paste) enhanced CPSPE sensor.

According to the results obtained, AuNS-SWCNTs-GO gives the highest current for the Cr(VI) concentration followed by AuNS-SWCNTs and AuNS alone. There is an increase of 16% current for AuNS-SWCNTs & 42% current for AuNS-SWCNTs-GO when compared to the current output of AuNS alone. Increase in current is approximately 22% for AuNS-SWCNTs-GO when compared to AuNS-SWCNTs. As a result, AuNS-SWCNTs-GO (layer by layer drop casted on carbon paste) enhanced CPSPE sensor is found to be highly sensitive and robust for detection of chromium (VI).

Example 11. Detection of Low Concentration Hexavalent Chromium (Cr(VI)) by the AuNS-SWCNTs-GO (Layer by Layer Drop Casted on Carbon Paste) Enhanced CPSPE Sensor Cr(VI) solutions of known concentrations (0, 10, 25, 50, 100, 200, 300, 400, 500, 1000 ppb) were prepared in water. The solution was tested according to Example 8 using the AuNS-SWCNTs-GO enhanced CPSPE sensor of Example 4 in 0.1 M $H_2SO_4$. LSV parameters used: Initial Potential: 0.7 V, Final Potential: −0.8 V, Scan rate: 0.05 Vsec$^{-1}$.

Figure 9A:
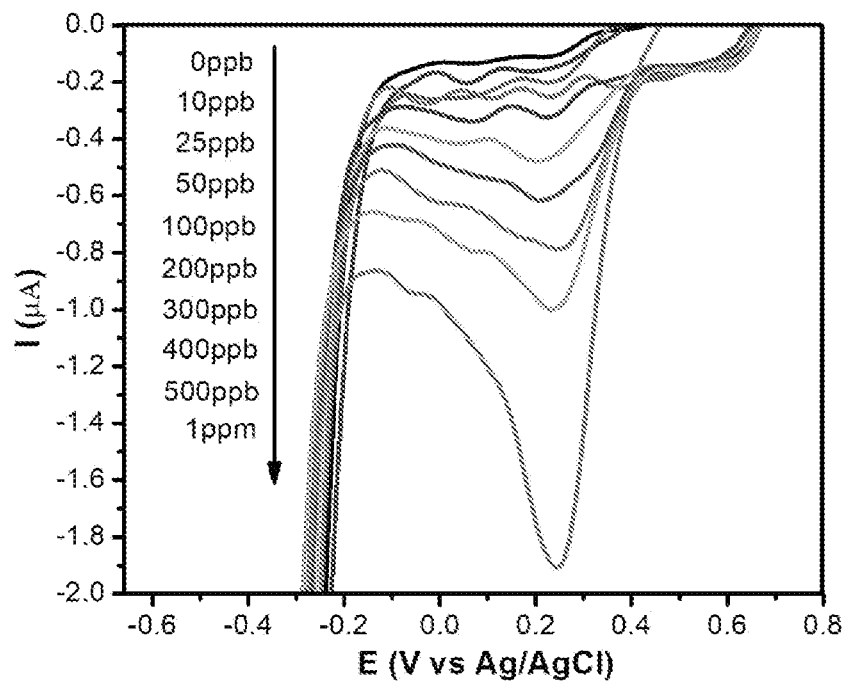
FIGS. 9A and 9B are graphs showing detection of low concentration $Cr^{6+}$ in aqueous samples by the AuNS-SWCNTs-GO (layer by layer drop casted on carbon paste) enhanced CPSPE sensor.
Figure 9B:
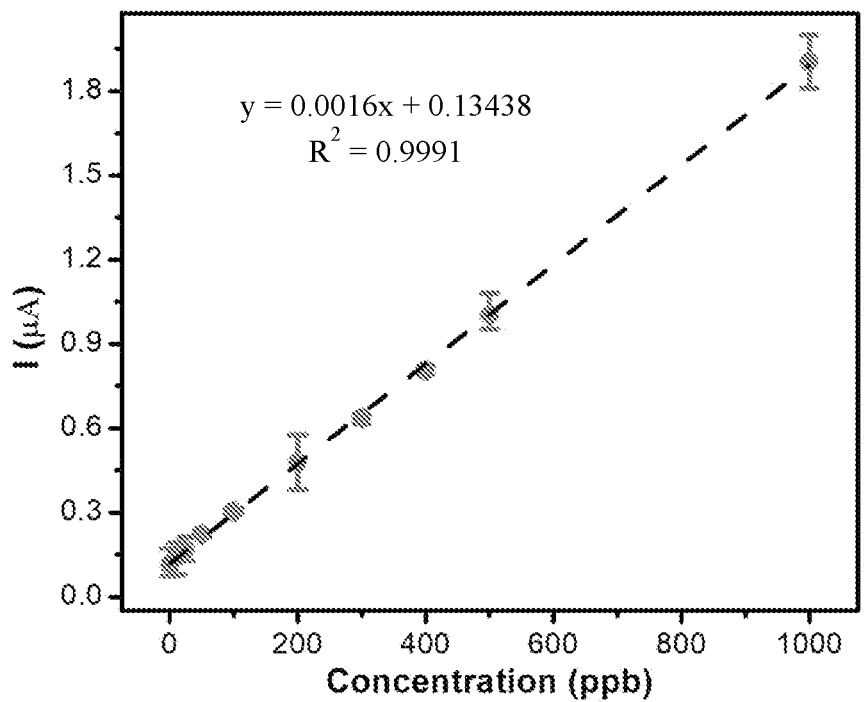

FIG. 9A is a linear sweep voltammogram showing detection of hexavalent chromium (Cr(VI)) at 0, 10, 25, 50, 100, 200, 300, 400, 500, and 1000 ppb, and FIG. 9B is a calibration curve based on FIG. 9A. FIGS. 9A and 9B demonstrate a detection over a large concentration range.

Example 12. Detection of Medium Concentration Hexavalent Chromium (Cr(VI)) by the AuNS-SWCNTs-GO (Layer by Layer Drop Casted on Carbon Paste) Enhanced CPSPE Sensor Cr(VI) solutions of known concentrations (0, 2, 5, 10, 20, 30, 50, 75 ppm) were prepared in water. The solution was tested according to Example 8 using the AuNS-SWCNTs-GO of Example 4 enhanced CPSPE sensor in 0.1M $H_2SO_4$. LSV parameters used: Initial Potential: 0.7 V, Final Potential: −0.8 V, Scan rate: 0.05 Vsec$^{-1}$.

Figure 10A:
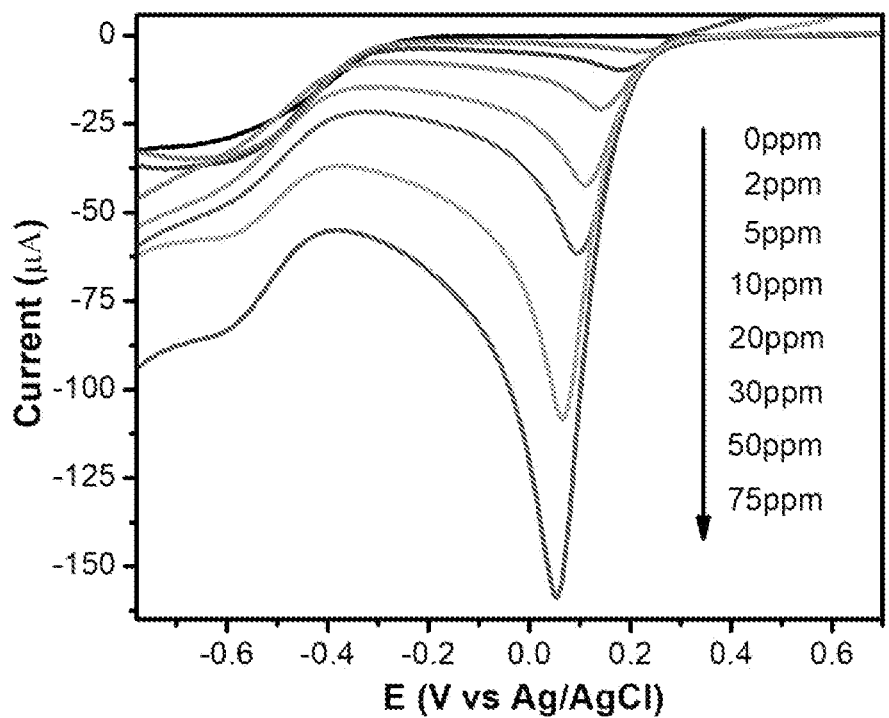
FIGS. 10A and 10B are graphs showing detection of medium concentration $Cr^{6+}$ in aqueous samples by the AuNS-SWCNTs-GO (layer by layer drop casted on carbon paste) enhanced CPSPE sensor.
Figure 10B:
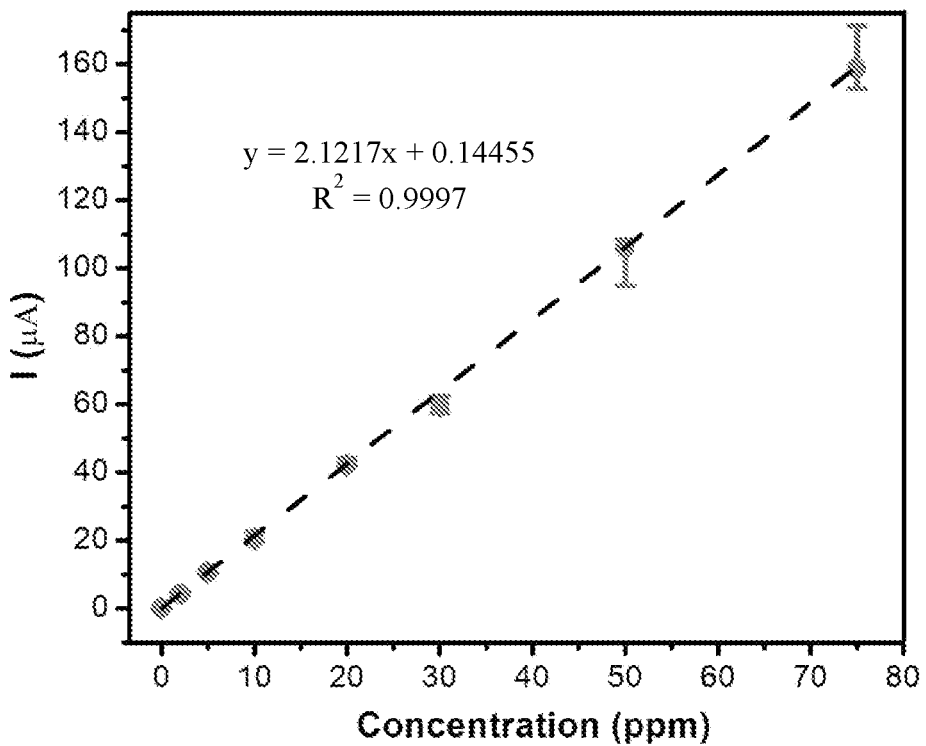

FIG. 10A is a linear sweep voltammogram showing detection of hexavalent chromium (Cr(VI)) at 0, 2, 5, 10, 20, 30, 50, and 75 ppm, and FIG. 10B is a calibration curve based on FIG. 10A. FIGS. 10A and 10B demonstrate detection over a large concentration range.

Example 13. Detection of High Concentration Hexavalent Chromium (Cr(VI)) by the AuNS-SWCNTs-GO (Layer by Layer Drop Casted on Carbon Paste) Enhanced CPSPE Sensor Cr(VI) solutions of known concentrations (0, 100, 250, 500, 750, 1000 ppm) were prepared in water. The solution was tested according to Example 8 using the AuNS-SWCNTs-GO enhanced CPSPE sensor of Example 4 in 0.1

M $H_2SO_4$. LSV parameters used: Initial Potential: 0.7 V, Final Potential: −0.8 V, Scan rate: 0.05 Vsec$^{-1}$.

Figure 11A:
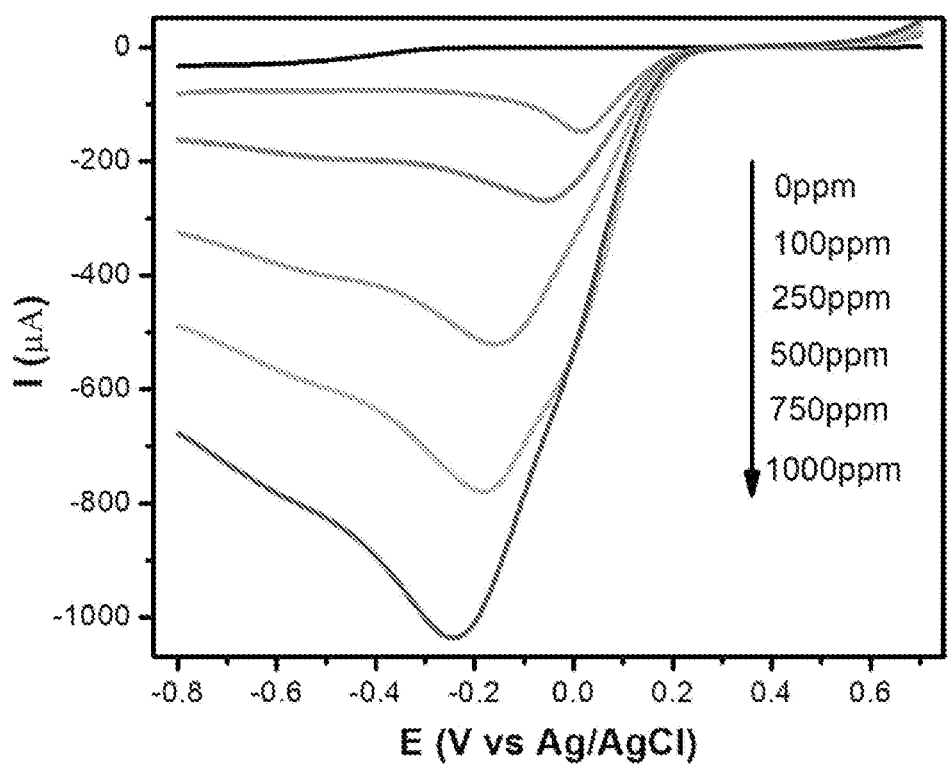
FIGS. 11A and 11B are graphs showing detection of high concentration $Cr^{6+}$ in aqueous samples by the AuNS-SWCNTs-GO (layer by layer drop casted on carbon paste) enhanced CPSPE sensor.
Figure 11B:
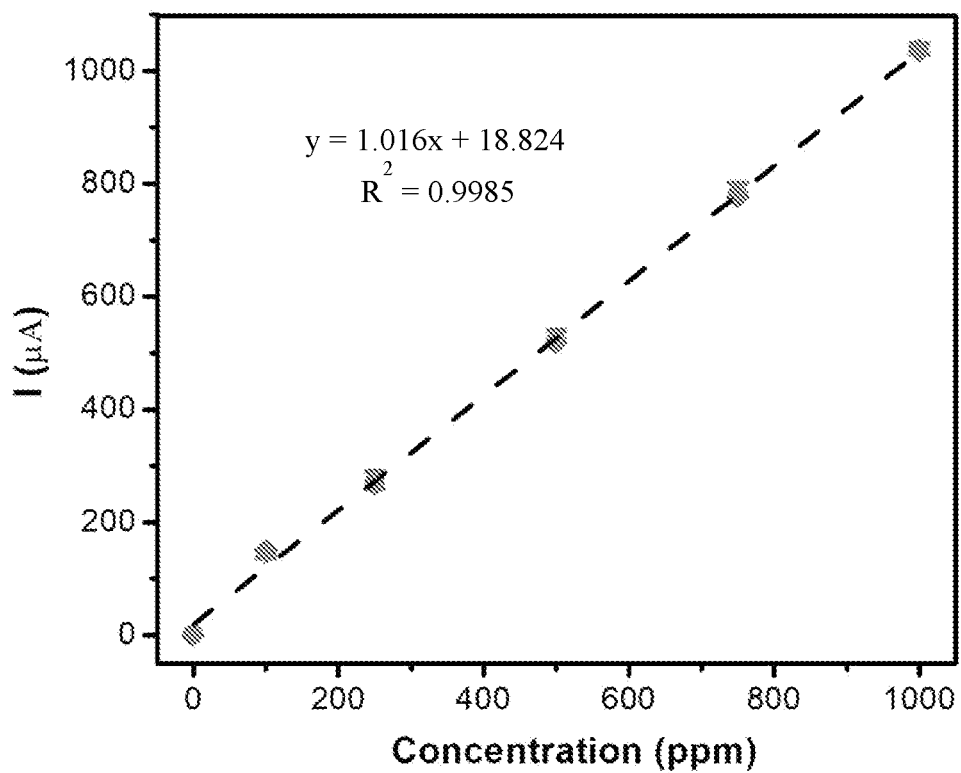

FIG. 11A is a linear sweep voltammogram showing detection of hexavalent chromium (Cr(VI)) at 0, 100, 250, 500, 750, and 1000 ppm, and FIG. 11B is a calibration curve based on FIG. 11A. FIGS. 11A and 11B demonstrate detection over a large concentration range.

Example 14. Detection of Lead ($Pb^{2+}$), Arsenic ($As^{3+}$) and Mercury ($Hg^{2+}$) Individually and Together by the AuNS-SWCNTs-GO (Layer by Layer Drop Casted on Carbon Paste) Enhanced CPSPE Sensor Individual solutions of known concentration of lead (0, 10, 50, 100 ppb), mercury (0, 10, 50, 100 ppb), and arsenic (0, 10, 25, 50, 100 ppb) were prepared in water. These solutions were tested according to Example 8 using the AuNS-SWCNTs-GO (layer by layer drop casted on carbon paste) enhanced CPSPE sensor of Example 4. Solutions with lead and solutions with arsenic were tested in 0.1M HCl, whereas solutions with mercury were tested in 0.01 M HCl.

Combined solutions with known, equal concentrations of lead, arsenic & mercury (0, 25, 50, 100 ppb) were prepared in water (e.g., one solution contained 0 ppb lead, 0 ppb arsenic, and 0 ppb mercury; one solution contained 25 ppb lead, 25 ppb arsenic, and 25 ppb mercury; etc.). The solutions were tested using the AuNS-SWCNTs-GO (layer by layer drop casted on carbon paste) enhanced CPSPE sensor of Example 4.

Figure 12A:
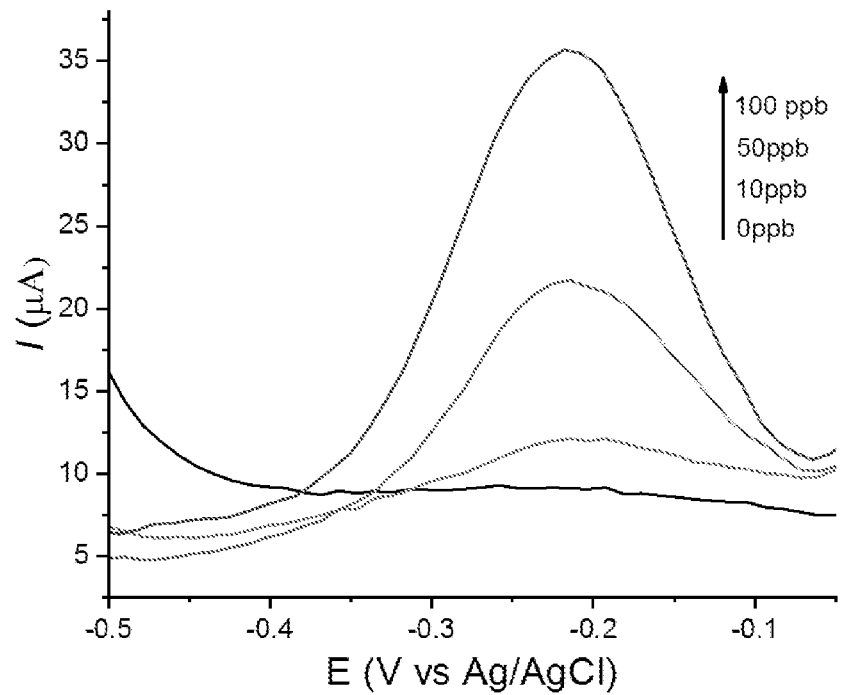
FIGS. 12A and 12B are graphs showing detection of $Pb^{2+}$ in aqueous samples with the AuNS-SWCNTs-GO (layer by layer drop casted on carbon paste) enhanced CPSPE sensor (Voltammograms) and its calibration plot.
Figure 12B:
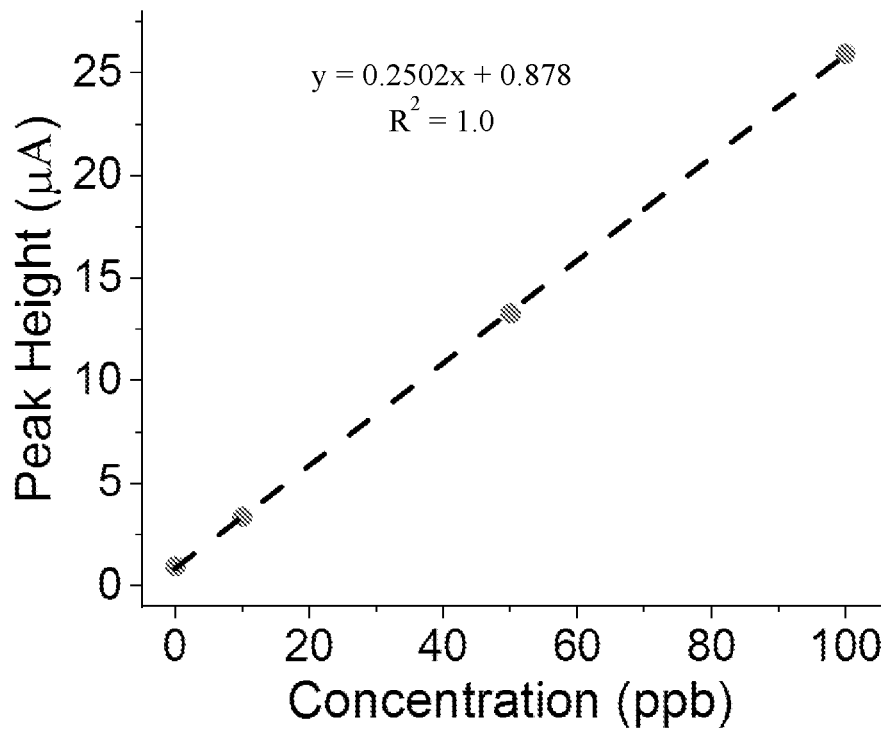
Figure 13A:
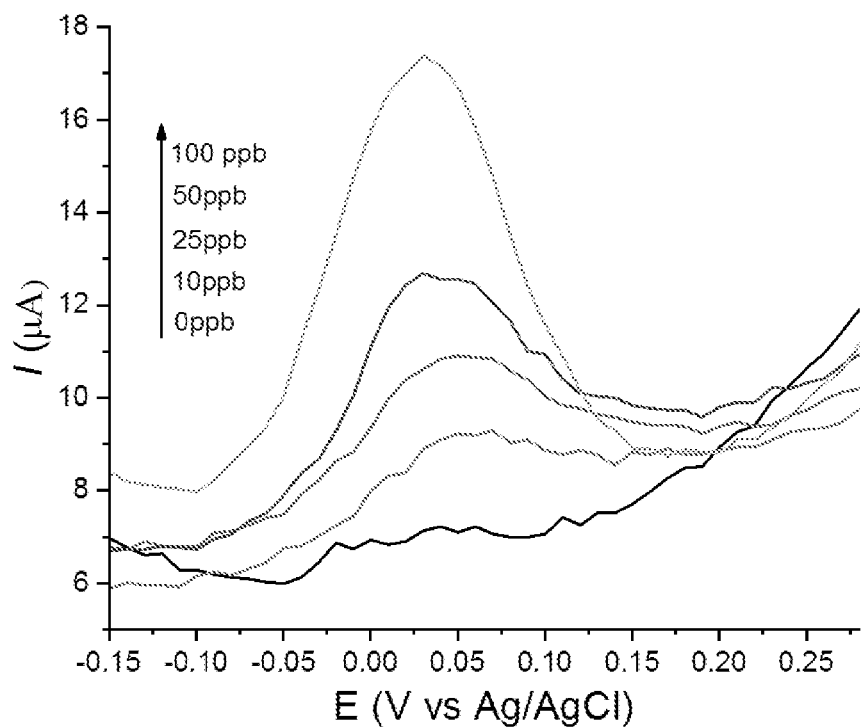
FIGS. 13A and 13B are graphs showing detection of $As^{3+}$ in aqueous samples with the AuNS-SWCNTs-GO (layer by layer drop casted on carbon paste) enhanced CPSPE sensor (Voltammograms) and its calibration plot.
Figure 13B:
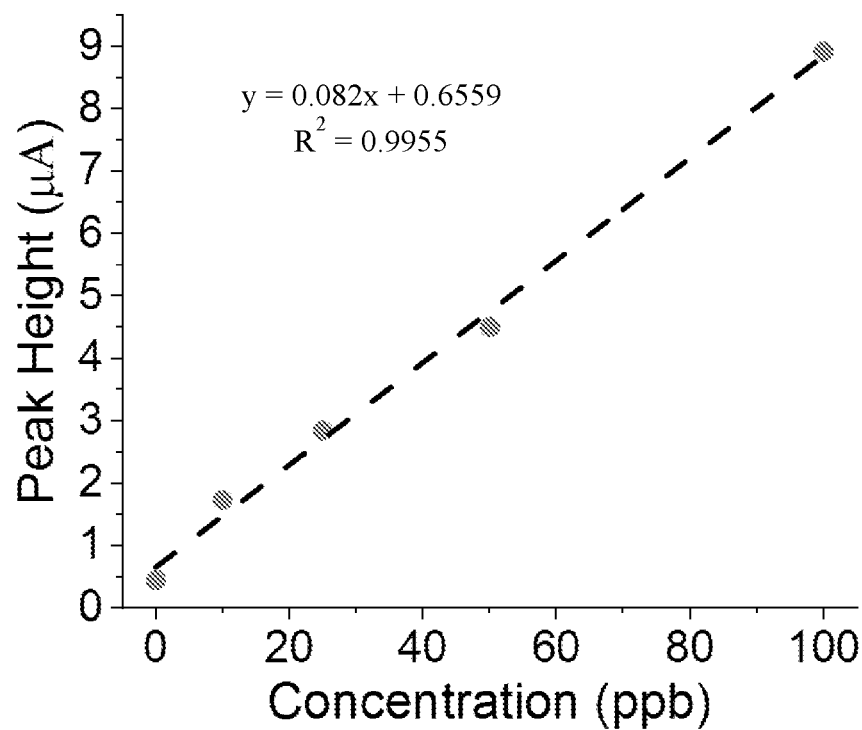
Figure 14A:
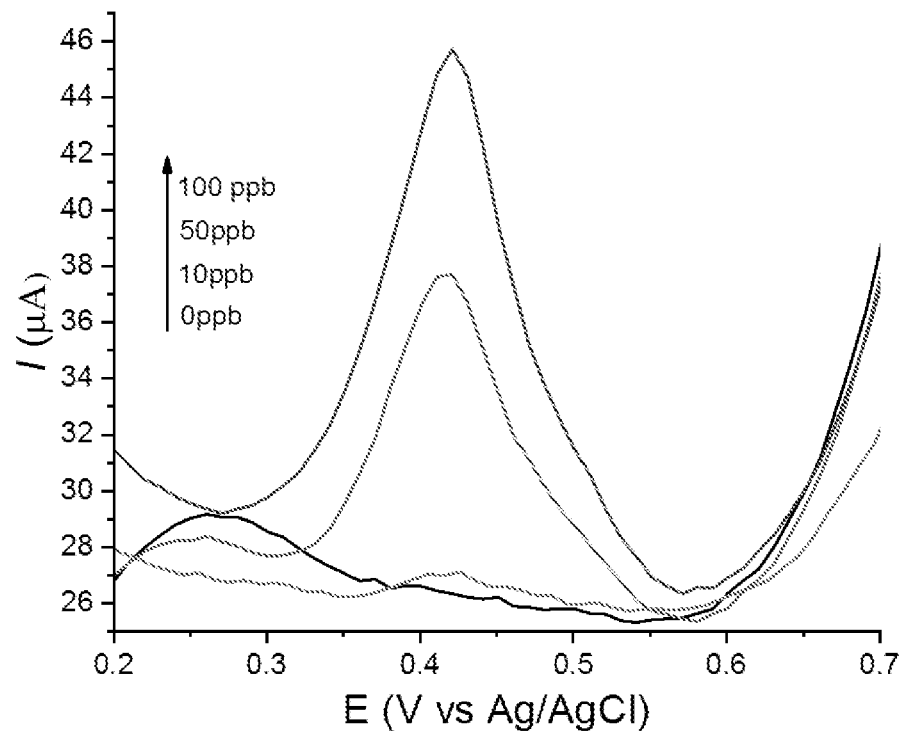
FIGS. 14A and 14B are graphs showing detection of $Hg^{2+}$ in aqueous samples with the AuNS-SWCNTs-GO (layer by layer drop casted on carbon paste) enhanced CPSPE sensor (Voltammograms) and its calibration plot.
Figure 14B:
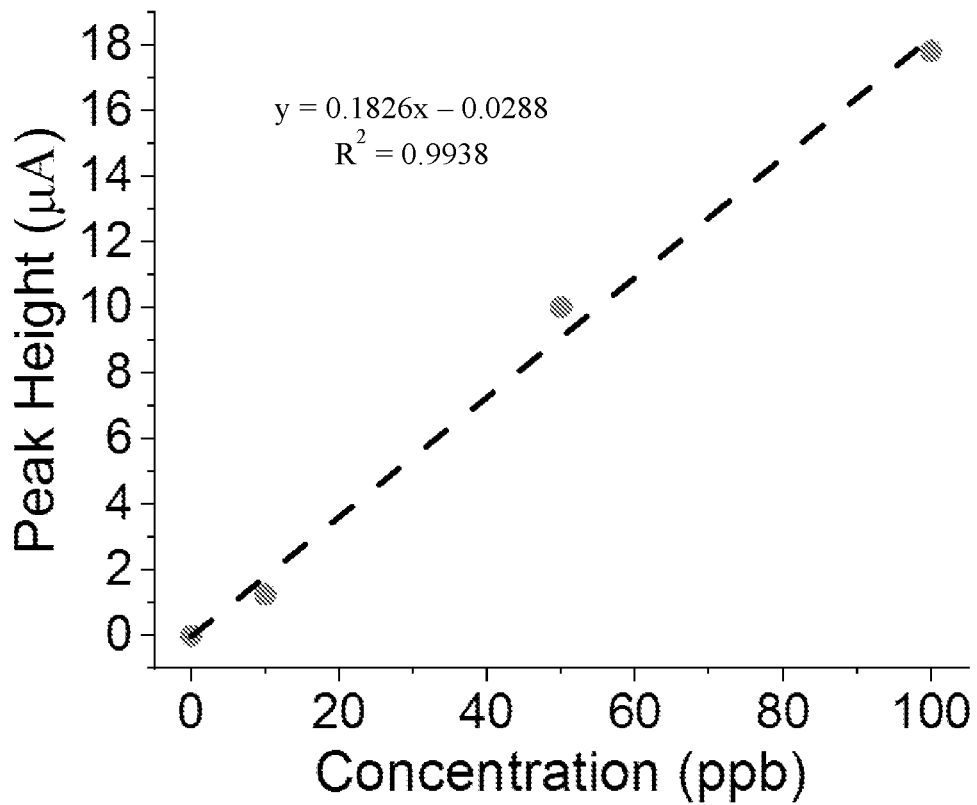
Figure 15A:
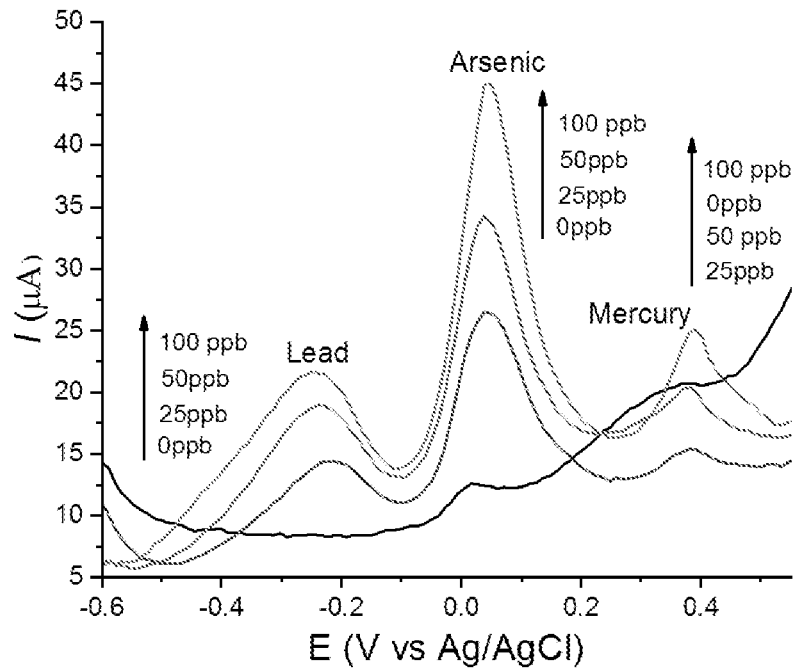
FIGS. 15A and 15B are graphs showing detection of $Pb^{2+}$, $As^{3+}$, $Hg^{2+}$ in aqueous samples with the AuNS-SWCNTs-GO (layer by layer drop casted on carbon paste) enhanced CPSPE sensor (Voltammograms) and its calibration plot.
Figure 15B:
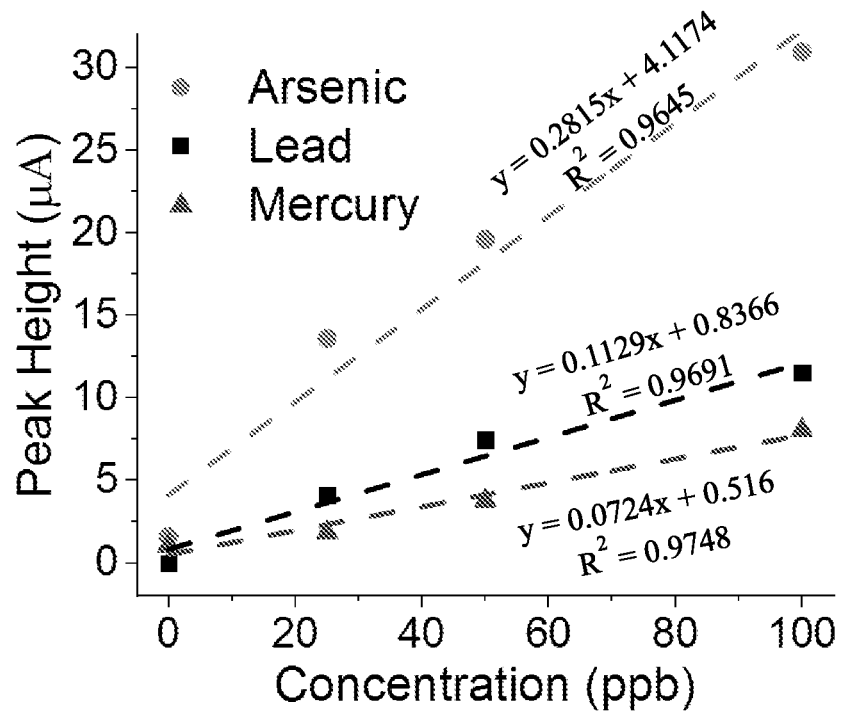

FIG. 12A is an anodic square wave stripping voltammogram showing detection of $Pb^{2+}$, and FIG. 12B is a calibration curve based on FIG. 12A. FIG. 13A is an anodic square wave stripping voltammogram showing detection of $As^{3+}$, and FIG. 13B is a calibration curve based on FIG. 13A. FIG. 14A is an anodic square wave stripping voltammogram showing detection of $Hg^{2+}$, and FIG. 14B is a calibration curve based on FIG. 14A. FIG. 15A is an anodic square wave stripping voltammogram showing detection of $Pb^{2+}$, $As^{3+}$, and $Hg^{2+}$ in a combined solution, and FIG. 15B is a calibration curve based on FIG. 15A. FIGS. 12A-15B demonstrate detection over a large concentration range. FIGS. 15A and 15B demonstrate detection of multiple analytes in a solution.

Example 15. Detection of Lead ($Pb^{2+}$), Arsenic ($As^{3+}$) and Mercury ($Hg^{2+}$) Individually and Together by the AuNS-SWCNTs (Layer by Layer Drop Casted on Carbon Paste) Enhanced CPSPE Sensor Individual solutions of known concentration of lead, arsenic and mercury solutions of (0, 10, 50, 100 ppb) were prepared in water. These solutions were tested of Example 8 using the AuNS-SWCNTs (layer by layer drop casted on carbon paste) enhanced CPSPE sensor of Example 5.

Combined solutions with known concentrations of lead (0, 50, 100, 150 ppb), mercury (0, 50, 100, 150 ppb), and arsenic (0, 50, 100, 200 ppb) was prepared in water. The solutions were tested using the AuNS-SWCNTs (layer by layer drop casted on carbon paste) enhanced CPSPE sensor of Example 5.

Figure 16A:
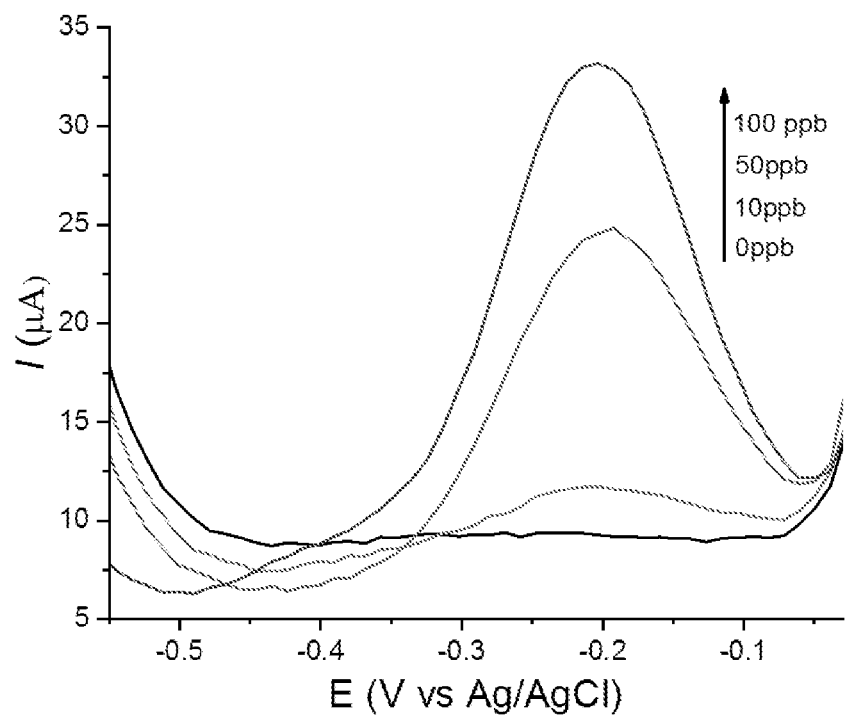
FIGS. 16A and 16B are graphs showing detection of $Pb^{2+}$ in aqueous samples with the AuNS-SWCNTs (layer by layer drop casted on carbon paste) enhanced CPSPE sensor (Voltammograms) and its calibration plot.
Figure 16B:
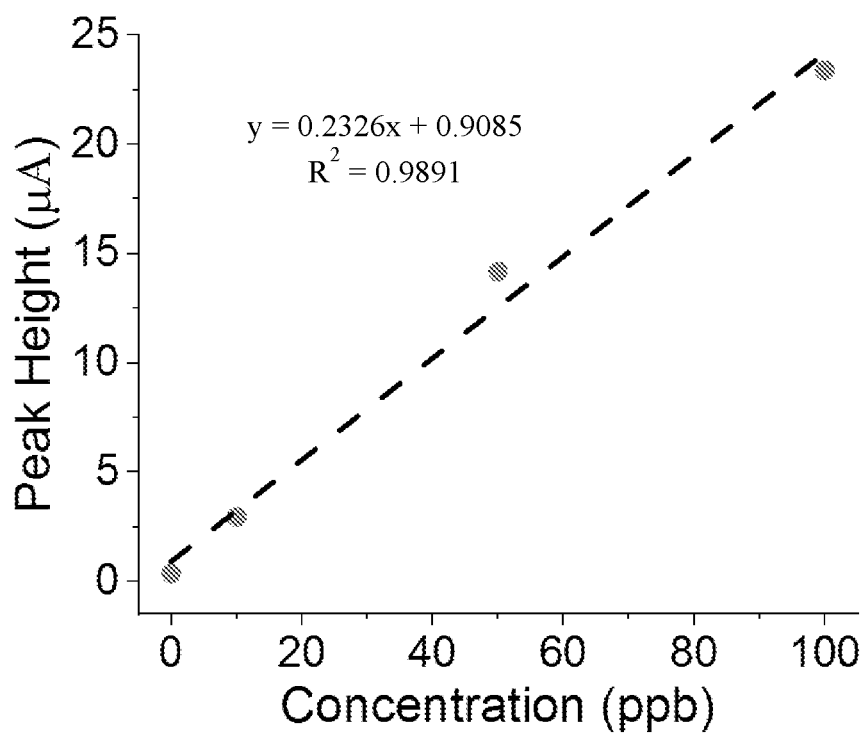
Figure 17A:
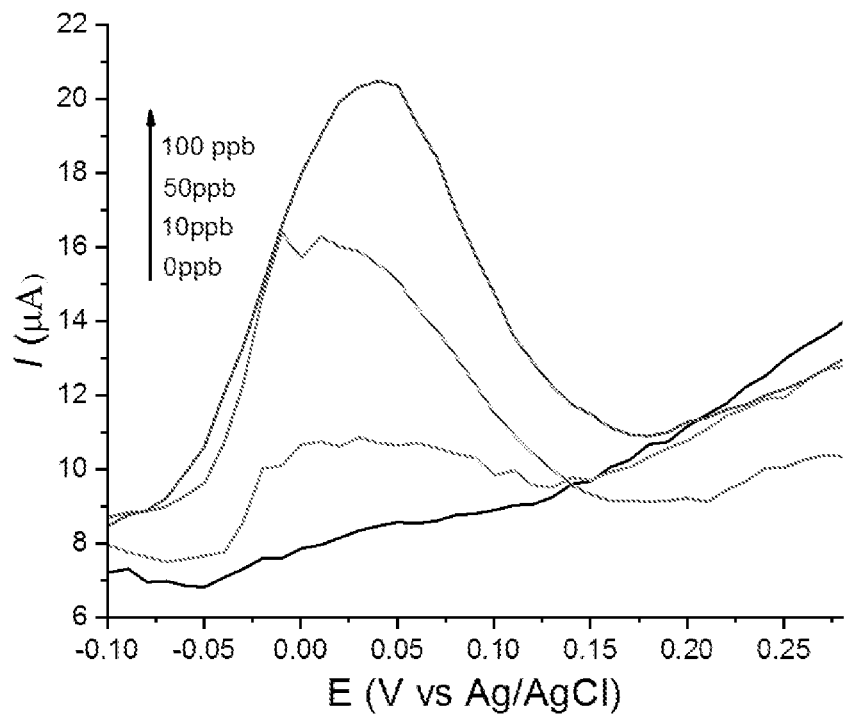
FIGS. 17A and 17B are graphs showing detection of $As^{3+}$ in aqueous samples with the AuNS-SWCNTs (layer by layer drop casted on carbon paste) enhanced CPSPE sensor (Voltammograms) and its calibration plot.
Figure 17B:
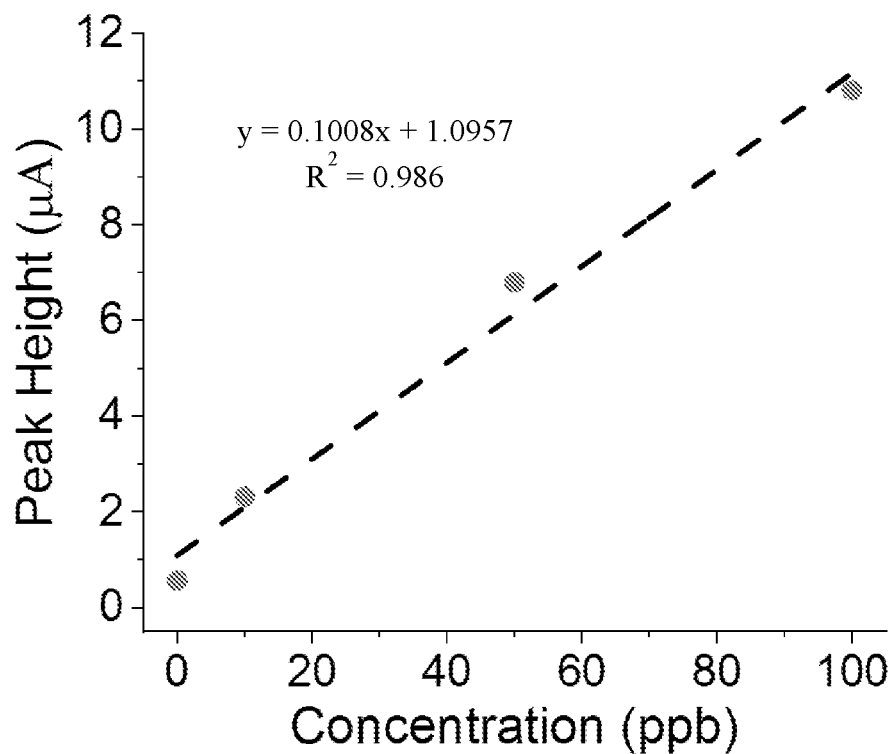
Figure 18A:
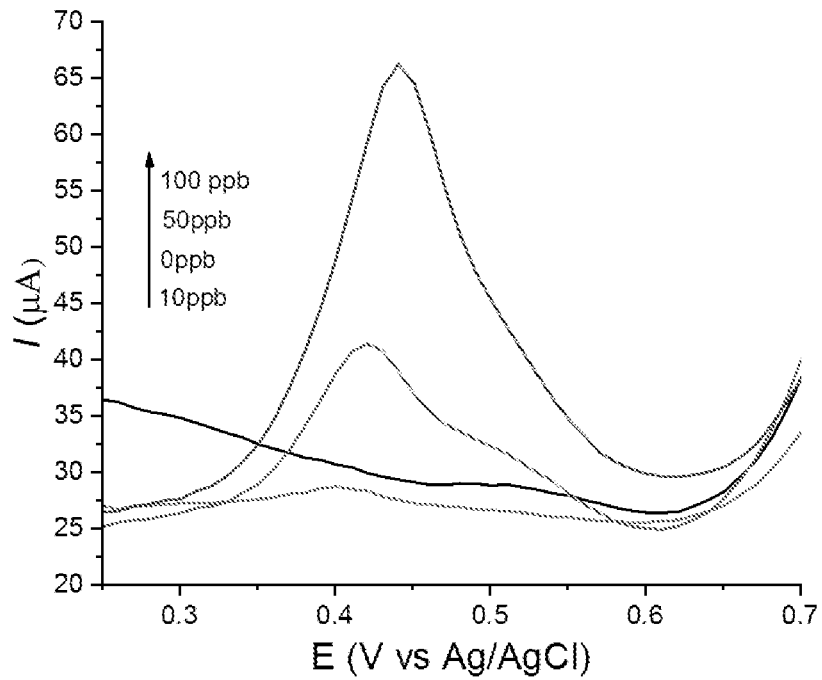
FIGS. 18A and 18B are graphs showing detection of $Hg^{2+}$ in aqueous samples with the AuNS-SWCNTs (layer by layer drop casted on carbon paste) enhanced CPSPE sensor (Voltammograms) and its calibration plot.
Figure 18B:
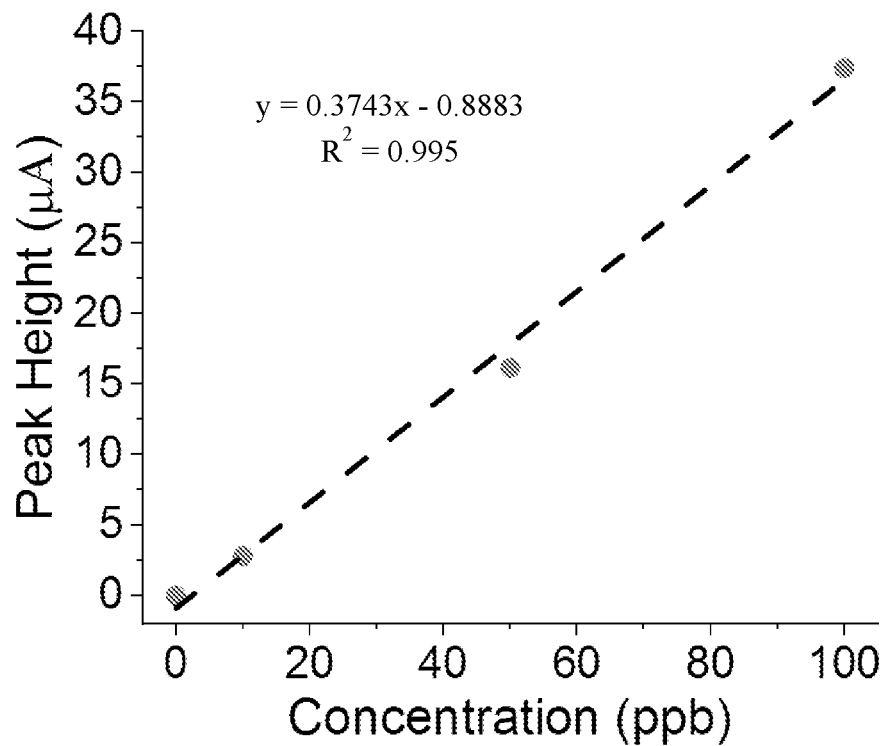
Figure 19A:
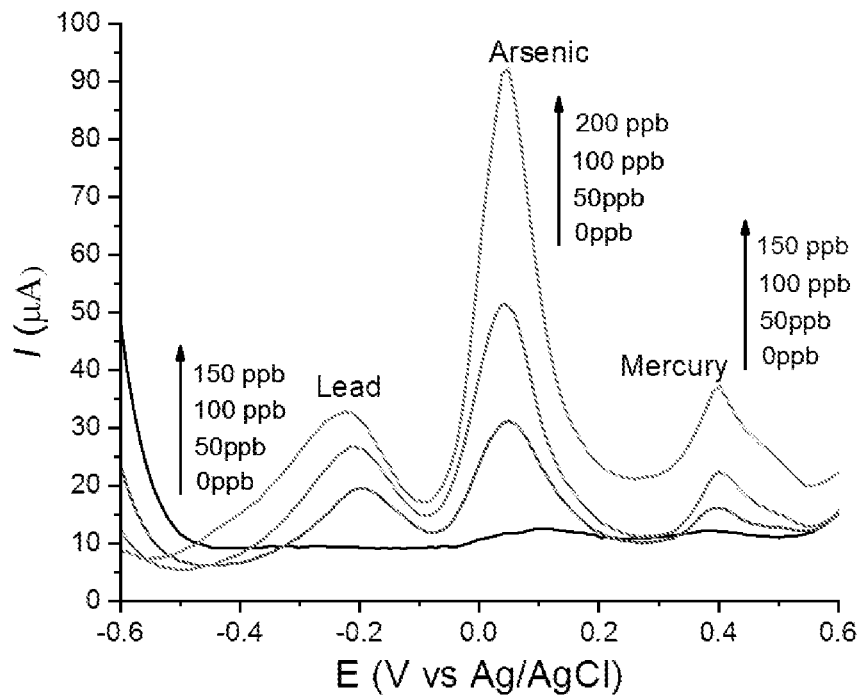
FIGS. 19A and 19B are graphs showing detection of $Pb^{2+}$, $As^{3+}$, $Hg^{2+}$ in aqueous samples with the AuNS-SWCNTs (layer by layer drop casted on carbon paste) enhanced CPSPE sensor (Voltammograms) and its calibration plot.
Figure 19B:
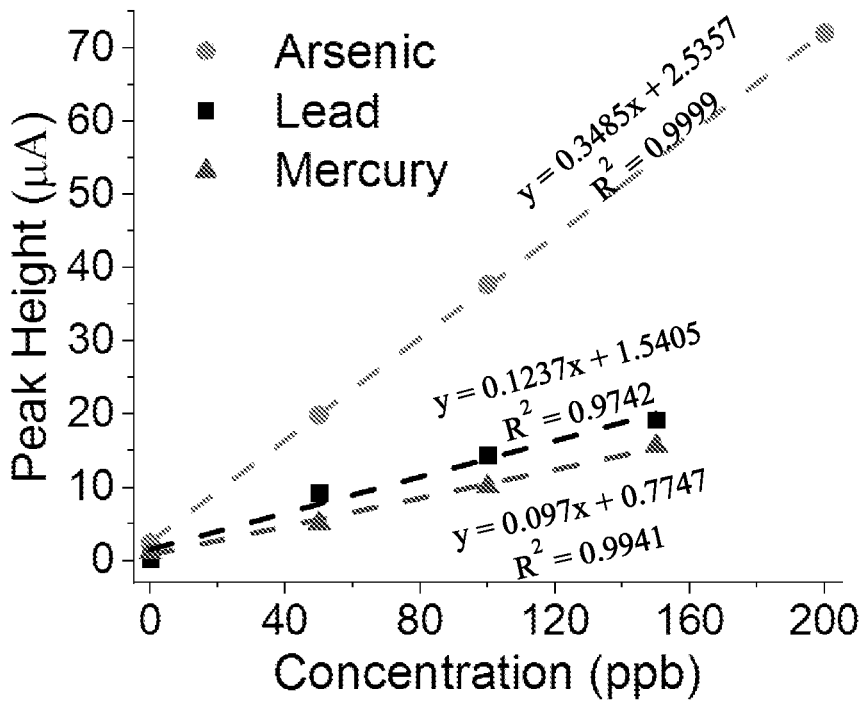

FIG. 16A is an anodic square wave stripping voltammogram showing detection of $Pb^{2+}$, and FIG. 16B is a calibration curve based on FIG. 16A. FIG. 17A is an anodic square wave stripping voltammogram showing detection of $As^{3+}$, and FIG. 17B is a calibration curve based on FIG. 17A. FIG. 18A is an anodic square wave stripping voltammogram showing detection of $Hg^{2+}$, and FIG. 18B is a calibration curve based on FIG. 18A. FIG. 19A is an anodic square wave stripping voltammogram showing detection of $Pb^{2+}$, $As^{3+}$, and $Hg^{2+}$ in a combined solution, and FIG. 19B is a calibration curve based on FIG. 19A. FIGS. 16A-19B demonstrate detection over a large concentration range. FIGS. 19A and 19B demonstrate detection of multiple analytes in a solution.

Example 16. Detection of Lead ($Pb^{2+}$), Arsenic ($As^{3+}$) and Mercury ($Hg^{2+}$) Individually and Together by the AuNS Enhanced CPSPE Sensor Individual solutions of known concentration of lead (0, 10, 25, 50, 75, 100 ppb), mercury (0, 10, 25, 50, 75, 100 ppb), and arsenic (0, 2.5, 5, 7.5, 10, 25, 50, 75, 100 ppb) were prepared in water. These solutions were tested of Example 8 using the AuNS enhanced CPSPE sensor of Example 6.

Combined solutions with known concentrations of lead, arsenic and mercury (0, 25, 50, 75 100, 125, 150, 175, 200 ppb) were prepared in water. The solutions were tested using the AuNS enhanced CPSPE sensor of Example 6.

Figure 20A:
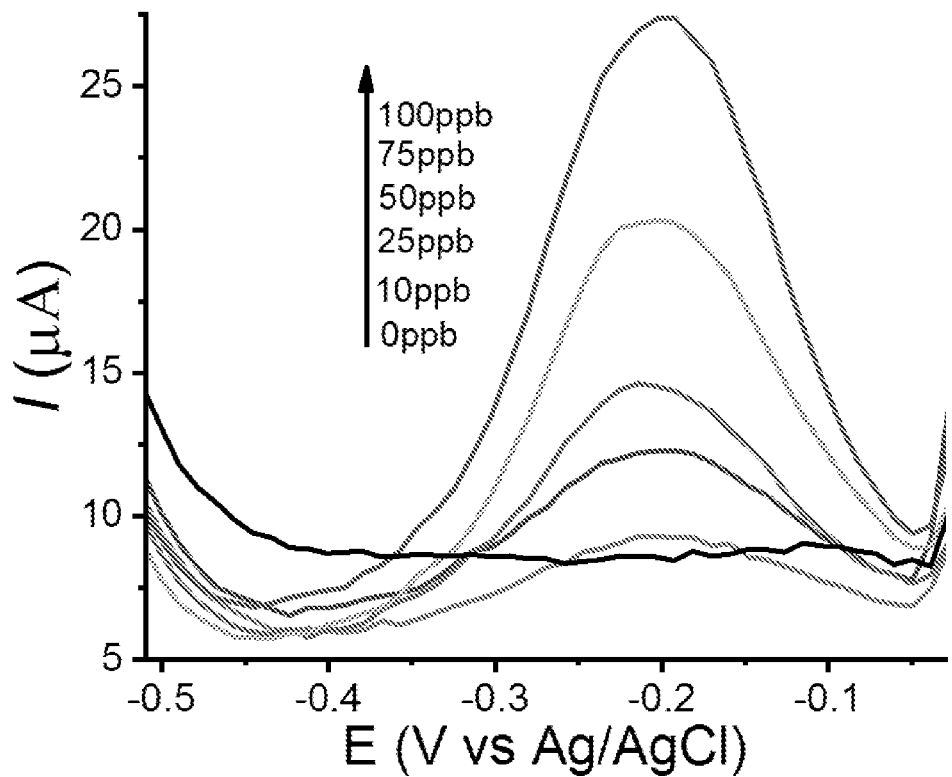
FIGS. 20A and 20B are graphs showing detection of $Pb^{2+}$ in aqueous samples with the AuNS enhanced CPSPE sensor (Voltammograms) and its calibration plot.
Figure 20B:
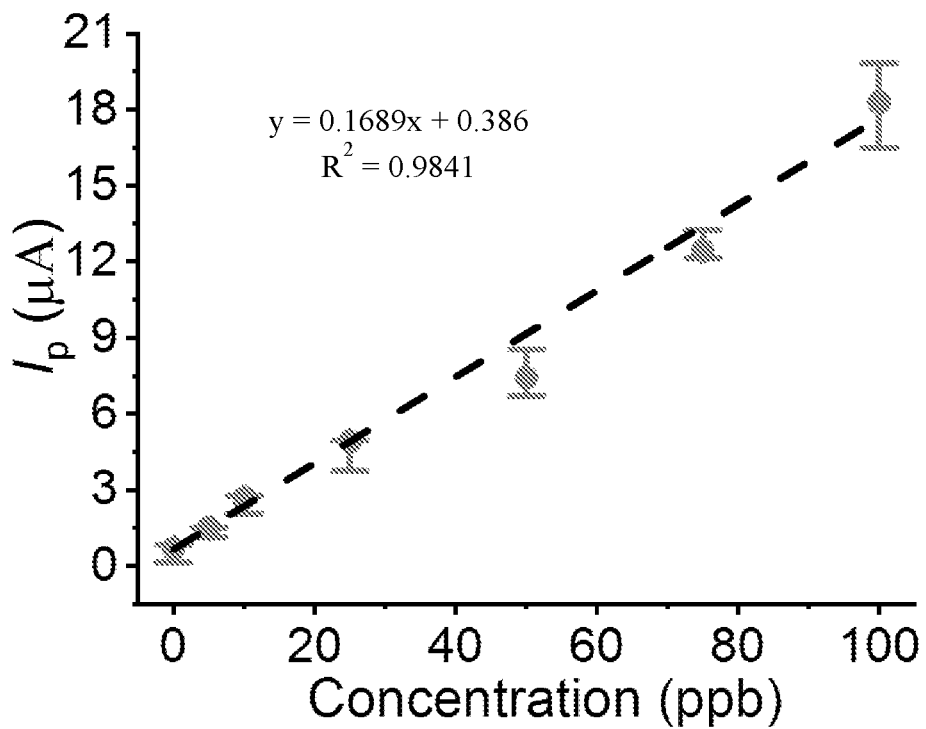
Figure 21A:
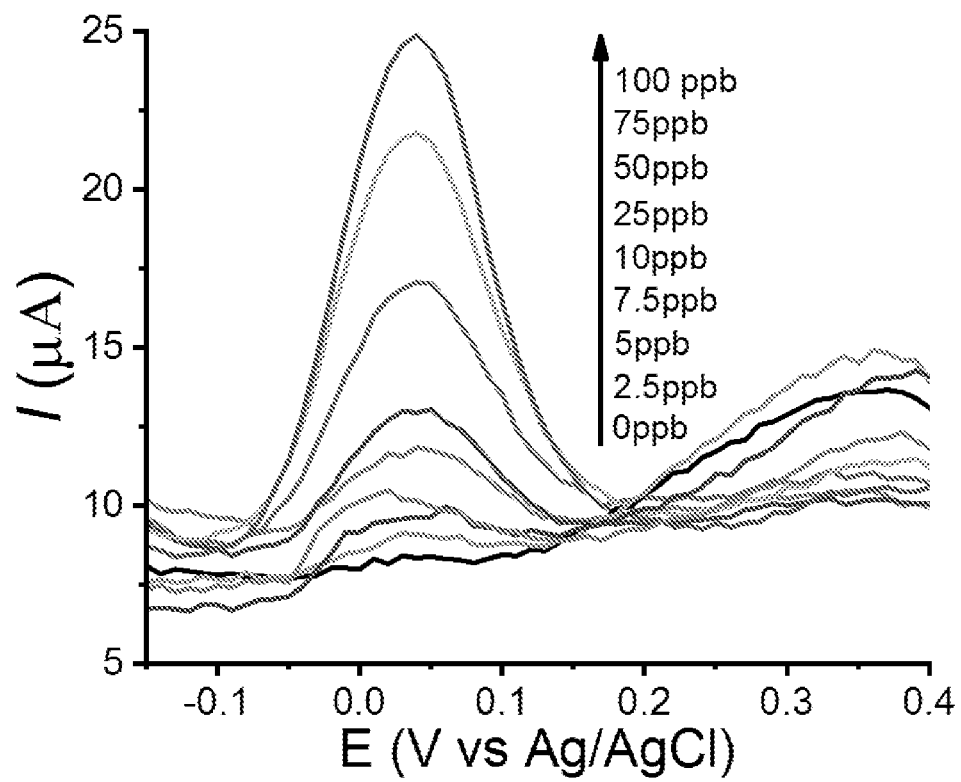
FIGS. 21A and 21B are graphs showing detection of $As^{3+}$ in aqueous samples with the AuNS enhanced CPSPE sensor (Voltammograms) and its calibration plot.
Figure 21B:
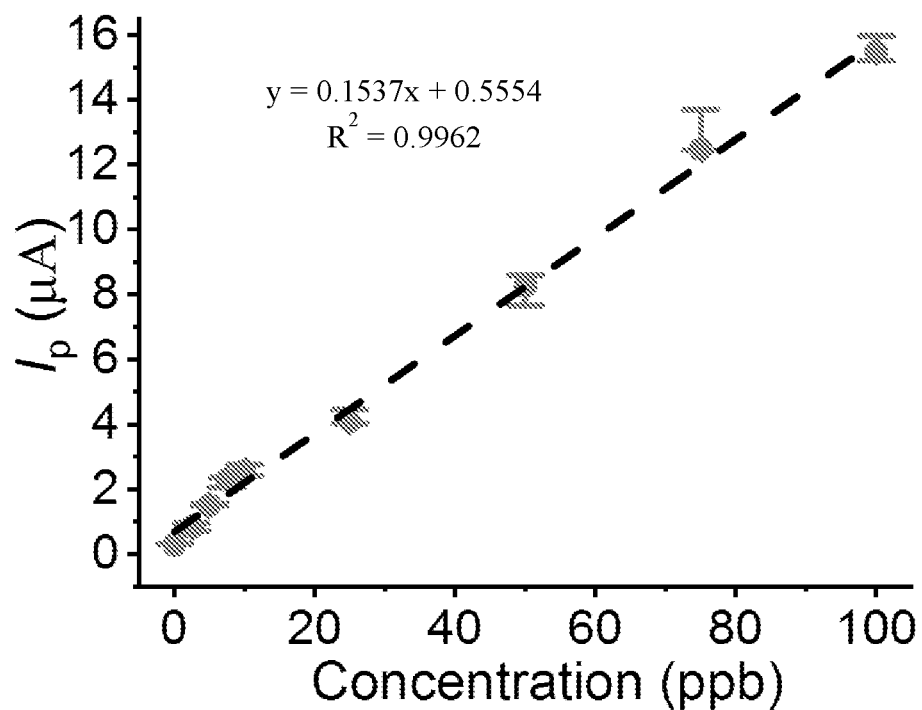
Figure 22A:
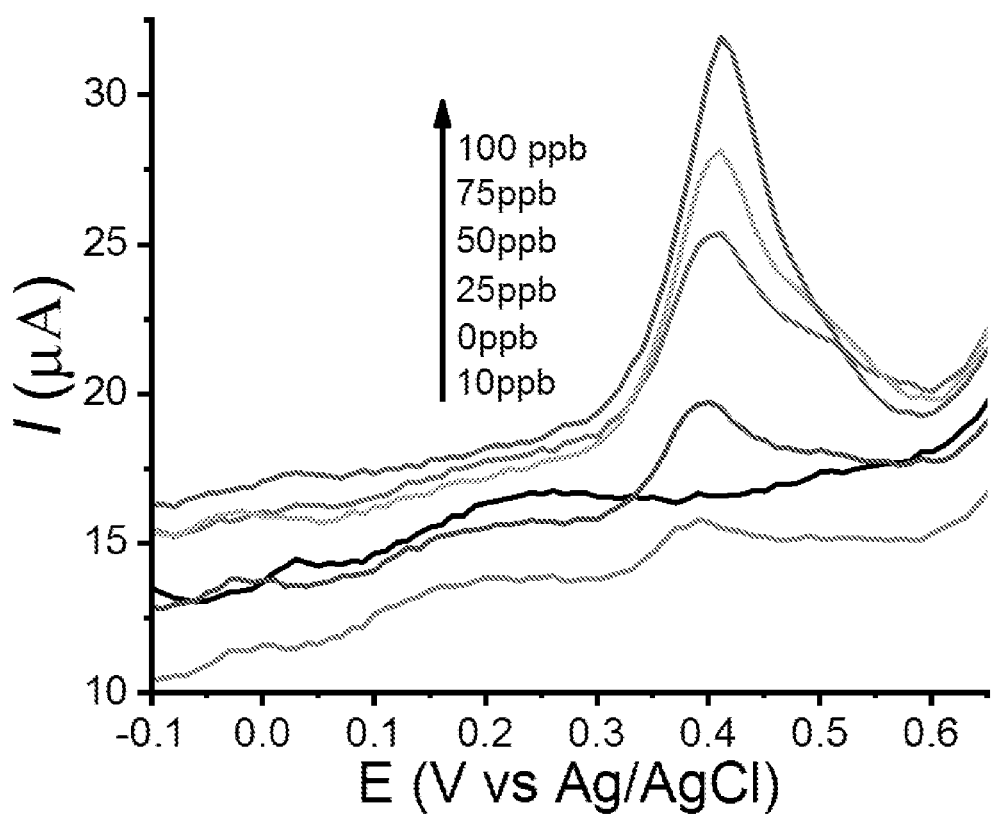
FIGS. 22A and 22B are graphs showing detection of $Hg^{2+}$ in aqueous samples with the AuNS enhanced CPSPE sensor (Voltammograms) and its calibration plot.
Figure 22B:
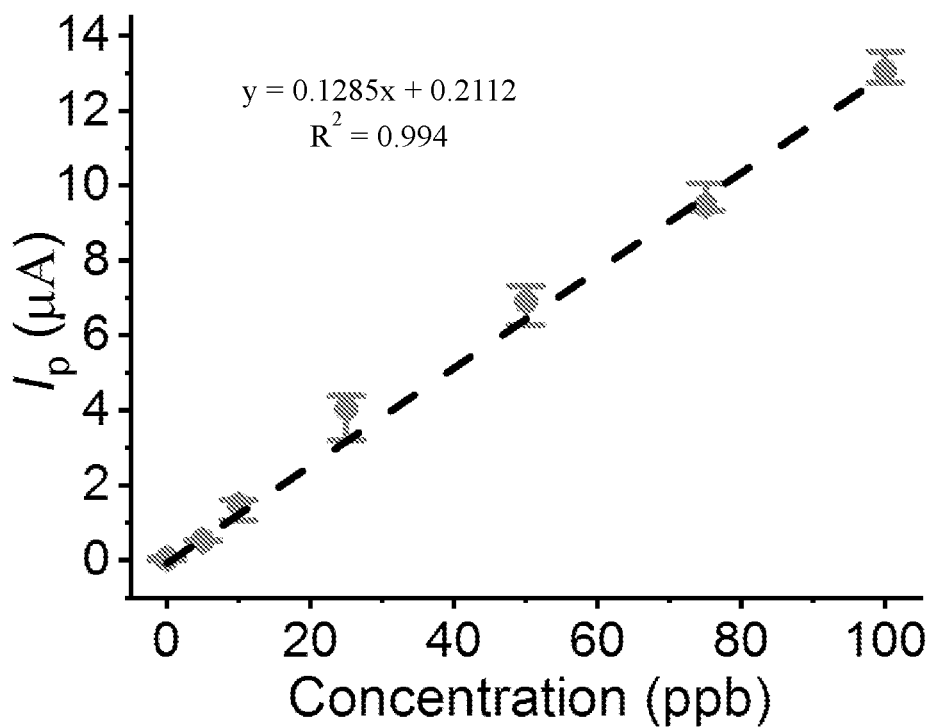
Figure 23A:
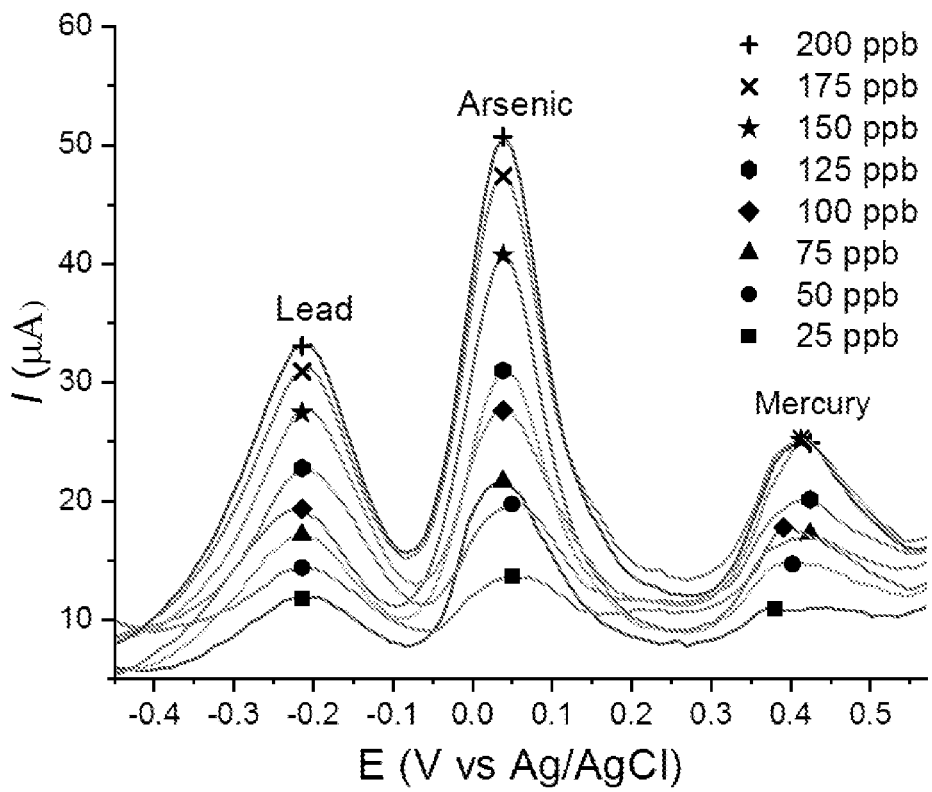
FIGS. 23A and 23B are graphs showing detection of $Pb^{2+}$, $As^{3+}$, $Hg^{2+}$ in aqueous samples with the AuNS enhanced CPSPE sensor (Voltammograms) and its calibration plot.
Figure 23B:
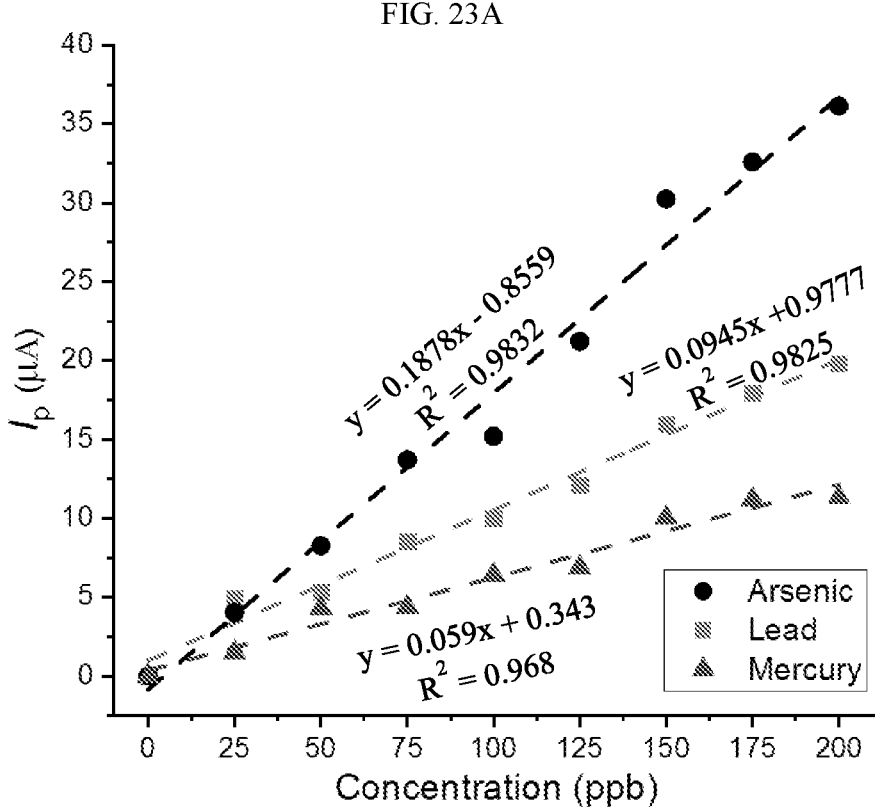

FIG. 20A is an anodic square wave stripping voltammogram showing detection of $Pb^{2+}$, and FIG. 20B is a calibration curve based on FIG. 20A. FIG. 21A is an anodic square wave stripping voltammogram showing detection of $As^{3+}$, and FIG. 21B is a calibration curve based on FIG. 21A. FIG. 22A is an anodic square wave stripping voltammogram showing detection of $Hg^{2+}$, and FIG. 22B is a calibration curve based on FIG. 22A. FIG. 23A is an anodic square wave stripping voltammogram showing detection of $Pb^{2+}$, $As^{3+}$, and $Hg^{2+}$ in a combined solution, and FIG. 23B is a calibration curve based on FIG. 23A. FIGS. 20A-23B demonstrate detection over a large concentration range. FIGS. 23A and 23B demonstrate detection of multiple analytes in a solution.

Example 17. Comparison of Results for Detection of Lead ($Pb^{2+}$), Arsenic ($As^{3+}$) and Mercury ($Hg^{2+}$) by the AuNS Alone, AuNS-SWCNTs (Layer by Layer Drop Casted on Carbon Paste) and AuNS-SWCNTs-GO (Layer by Layer Drop Casted on Carbon Paste) Enhanced CPSPE Sensor Results of 10, 50 and 100 ppb lead, arsenic and mercury solutions obtained using three different variety of sensors were compared. The three kinds of sensors are: i) AuNS drop cased on CPSPE, ii) SWCNTs and AuNS drop casted layer by layer on CPSPE and iii) GO, SWCNTs and AuNS drop casted layer by layer on CPSPE. According to the results obtained, the following points are concluded:

i) For lead detection, AuNS-SWCNTs and AuNS-SWCNTs-GO enhanced SPCPE sensor gives nearly similar results but better than AuNS enhanced SPCPE sensor. The increase in peak height is approximately 35% when compared to AuNS.

ii) For arsenic detection, AuNS enhanced SPCPE sensor gives the best results with an increase of approximately 30% peak height compared to AuNS-SWCNTs and 50% when compared to AuNS-SWCNTs-GO.

iii) For mercury detection, AuNS-SWCNTs enhanced SPCPE sensor gives the best results with an increase of approximately 60% peak height compared to AuNS and 55% when compared to AuNS-SWCNTs-GO.

Figure 24:
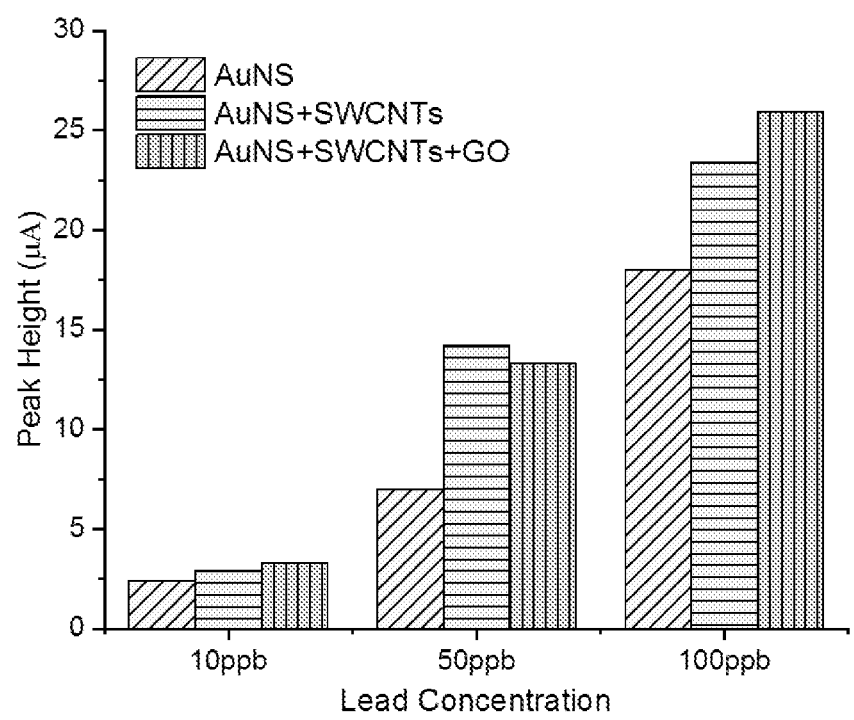
FIG. 24 is a chart comparing results for detection of lead ($Pb^{2+}$) by the AuNS alone, AuNS-SWCNTs (layer by layer drop casted on carbon paste) and AuNS-SWCNTs-GO (layer by layer drop casted on carbon paste) enhanced CPSPE sensor.
Figure 25:
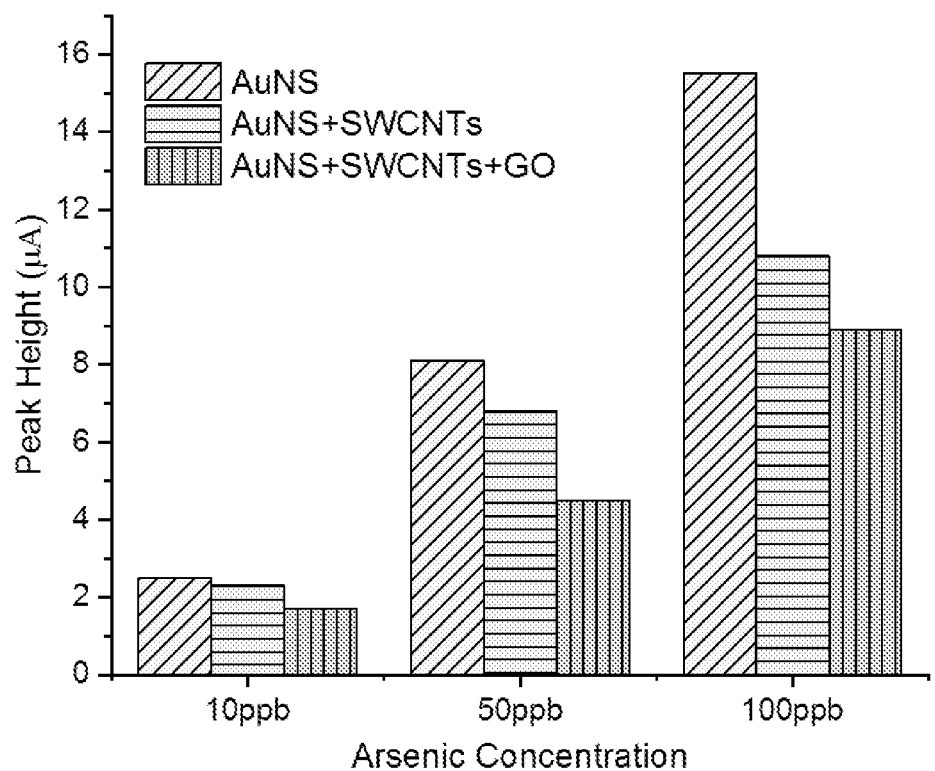
FIG. 25 is a chart comparing results for detection of arsenic ($As^{3+}$) by the AuNS alone, AuNS-SWCNTs (layer by layer drop casted on carbon paste) and AuNS-SWCNTs-GO (layer by layer drop casted on carbon paste) enhanced CPSPE sensor.
Figure 26:
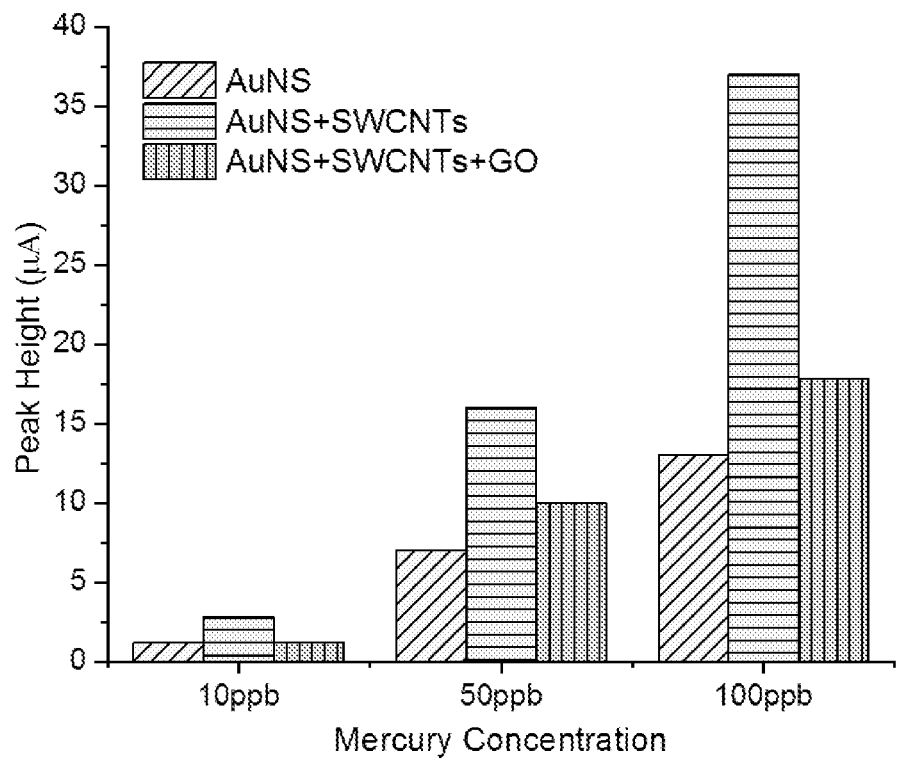
FIG. 26 is a chart comparing results for detection of mercury ($Hg^{2+}$) by the AuNS alone, AuNS-SWCNTs (layer by layer drop casted on carbon paste) and AuNS-SWCNTs-GO (layer by layer drop casted on carbon paste) enhanced CPSPE sensor.

FIGS. 24-26 are charts summarizing the results of Examples 14-16.

Figure 27A:
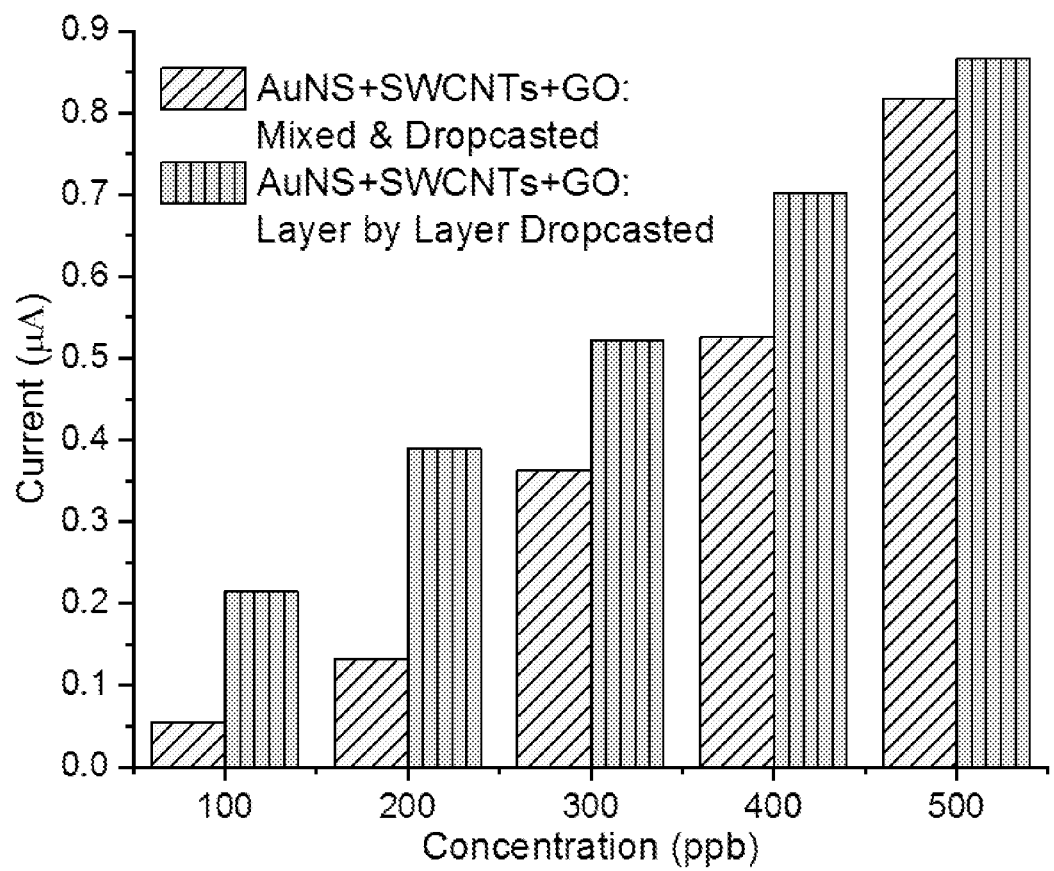
FIG. 27A is a chart.
Figure 27B:
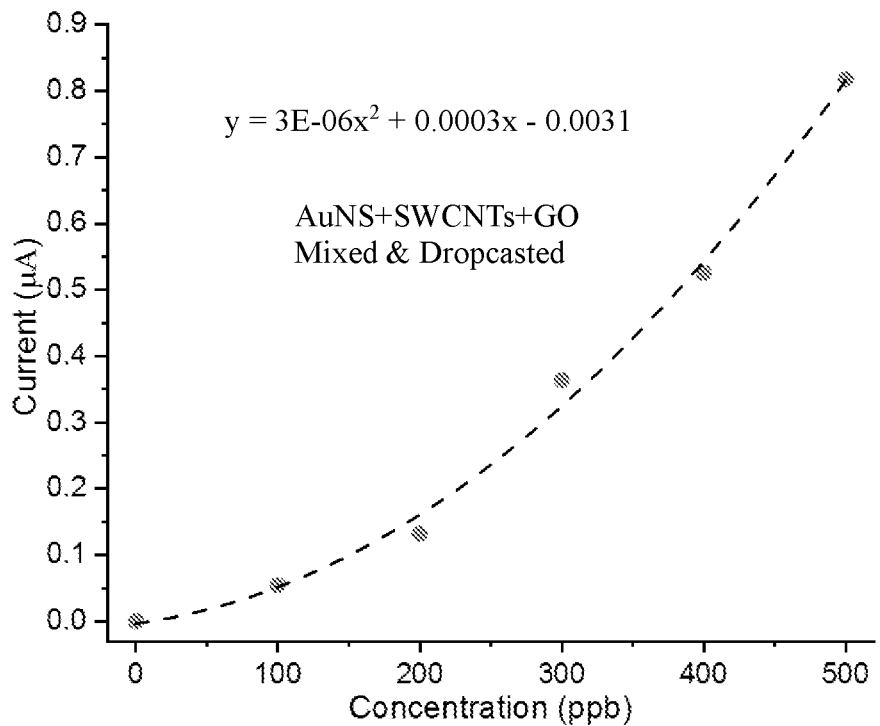
FIGS. 27B and 27C are charts, which collectively compare results for detection of chromium(VI) using AuNS+SWCNTs+GO Mixed & AuNS+SWCNTs+GO Layer by Layer Dropcasted.
Figure 27C:
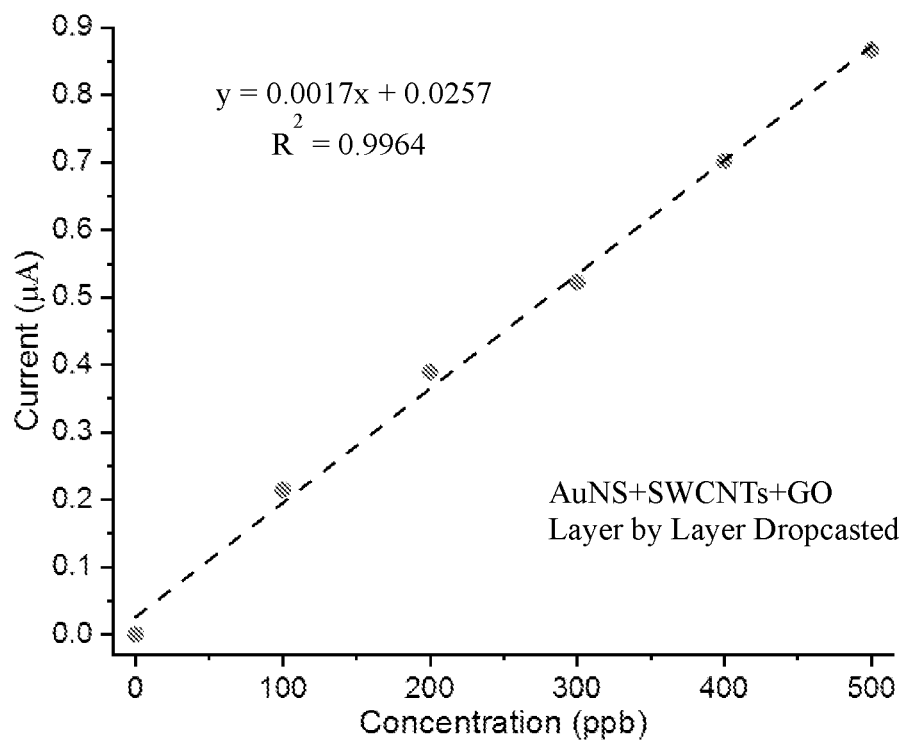

Example 18: Comparison of Chromium(VI) Detection Using AuNS+SWCNTs+GO Mixed & AuNS+SWCNTs+GO Layer by Layer Dropcasted Cr(VI) solutions of known concentrations (0, 100, 200, 300, 400, 500 ppb) were prepared in water. Comparison of results have been made by testing the solutions with 2 kinds of AuNS-SWCNTs-GO enhanced CPSPE sensors where i) mixed and dropcasted of Example 3, ii) layer by layer dropcasted of Example 4. From the above results, layer-by-layer dropcasting yields highly linear results as compared to mixed and dropcasted. Compared to the results of Example 9, which show mixed & dropcasted sensor (for different Cr(VI) concentrations), the results for Example 18 show that the current output is approximately 40% less when compared to layer by layer dropcasting. Moreover, it's difficult to achieve detection limit less than 100 ppb in case of mixed & dropcasted AuNS-SWCNTs-GO enhanced CPSPE sensors. The enhanced sensitivity for Cr(VI) detection using the layer-by-layer approach was discovered by coincidence. See FIG. 27A-C. As indicated FIG. 27A shows a side by side comparison of the current outputs for both the above mentioned sensors. It can be seen that the current output for mixed & dropcasted sensor (for different Cr(VI) concentrations) are approximately 40% less when compared to layer by layer dropcasting. In FIG. 27A, the baseline measurement at 0 ppb is subtracted out. FIGS. 27B and 27C demonstrates that the layer-by-layer dropcasting yields highly linear results when compared to mixed and dropcasted process of Example 9.

Example 19: Detection of Selenium ($Se^{4+}$) by the AuNS Enhanced CPSPE Sensor $Se^{4+}$ solutions of known concentrations (0, 50, 100, 250, 500, 1000 and 1500 ppb) were prepared in water. The solution was tested according to Example 8 using the AuNS enhanced CPSPE sensor of Example 6 in 0.1M $H_2SO_4$.

Figure 28A:
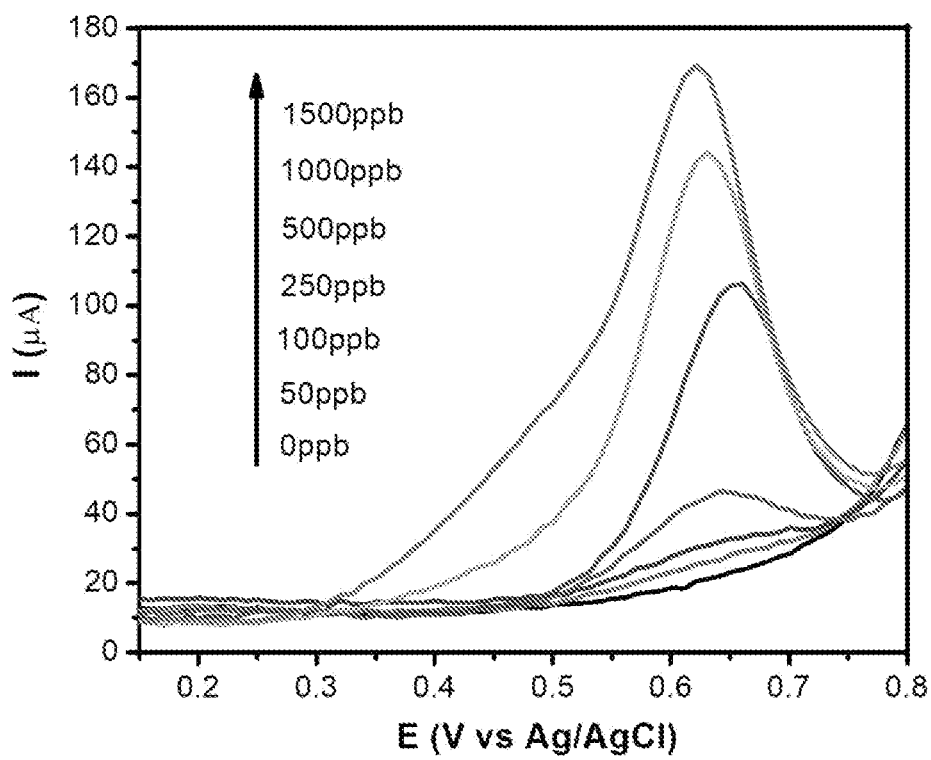
FIGS. 28A and 28B are graphs showing detection of $Se^{4+}$ in aqueous samples with an AuNS enhanced CPSPE sensor (Voltammograms) and its calibration plot.
Figure 28B:
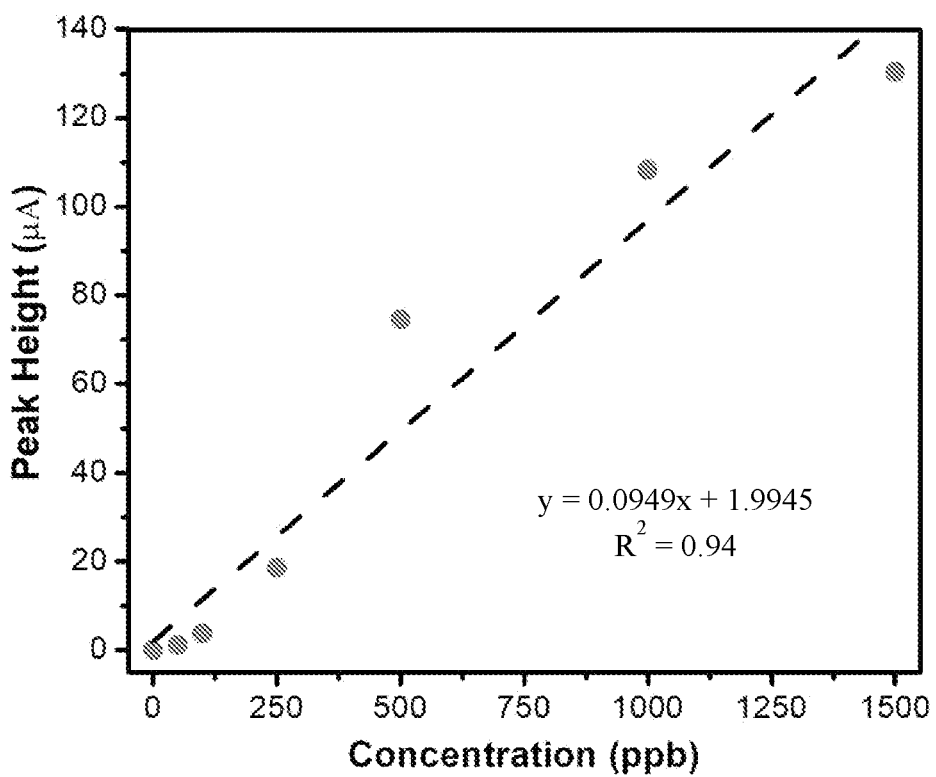

FIG. 28A is an anodic square wave stripping voltammogram showing detection of $Se^{4+}$, and FIG. 28B is a calibration curve based on FIG. 28A. FIGS. 28A and 28B demonstrate detection over a large concentration range.

Example 20: Detection of Copper ($Cu^{2+}$) by the AuNS Enhanced CPSPE Sensor $Cu^{2+}$ solutions of known concentrations (0, 100, 200 and 300 ppb) were prepared in water. The solution was tested according to Example 8 using the AuNS enhanced CPSPE sensor of Example 6 in 0.1M HCl.

Figure 32A:
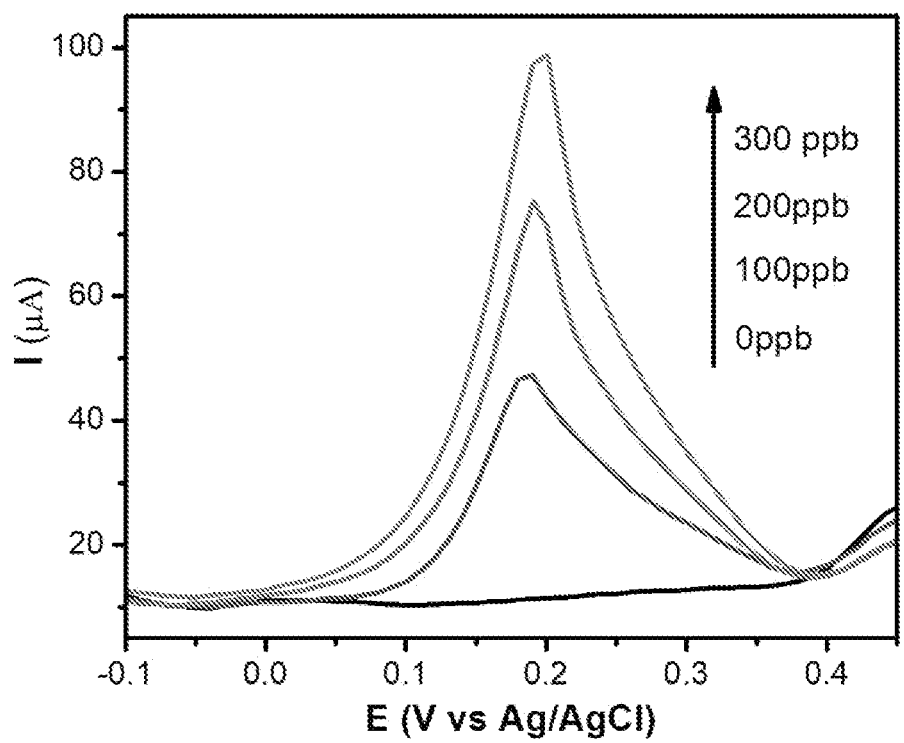
FIGS. 32A and 32B are graphs showing detection of $Cu^{2+}$ in aqueous samples with an AuNS enhanced CPSPE sensor (Voltammograms) and its calibration plot.
Figure 32B:
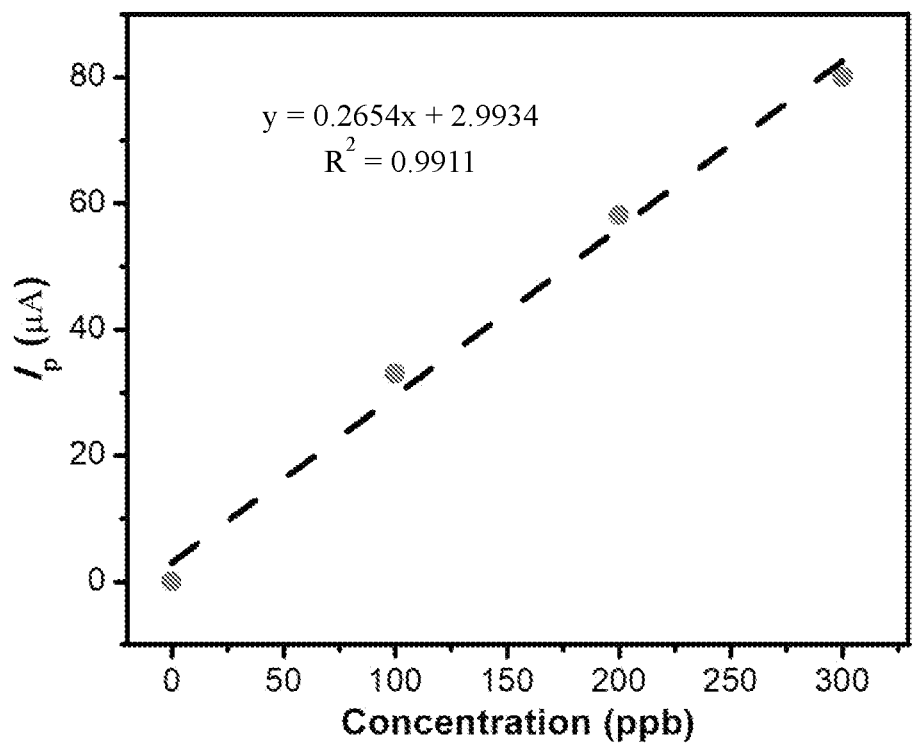

FIG. 32A is an anodic square wave stripping voltammogram showing detection of $Cu^{2+}$, and FIG. 32B is a calibration curve based on FIG. 32A. FIGS. 32A and 32B demonstrate detection over a large concentration range.

Figure 31A:
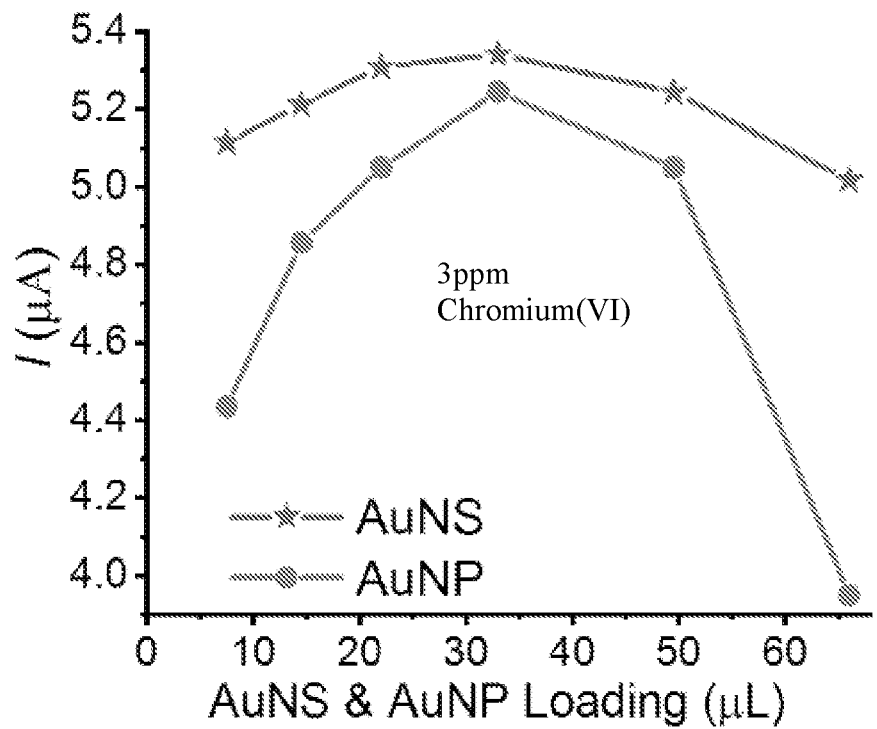
FIGS. 31A, 31B, and 31C are graphs comparing results for detection of chromium(VI) using different Gold Nanoparticles & Gold Nanostars loading on the CPSPE.
Figure 31B:
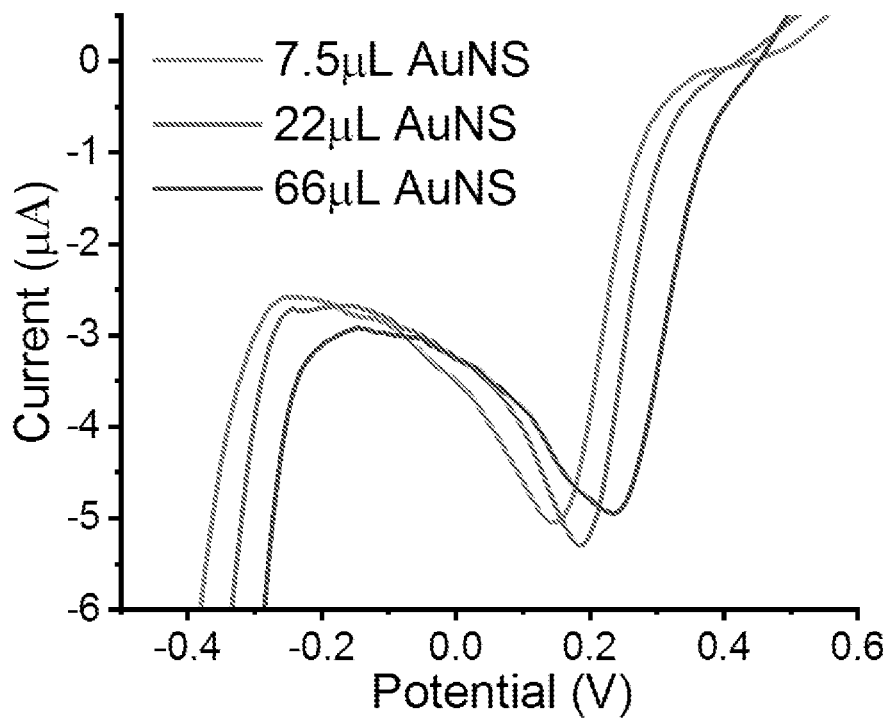
Figure 31C:
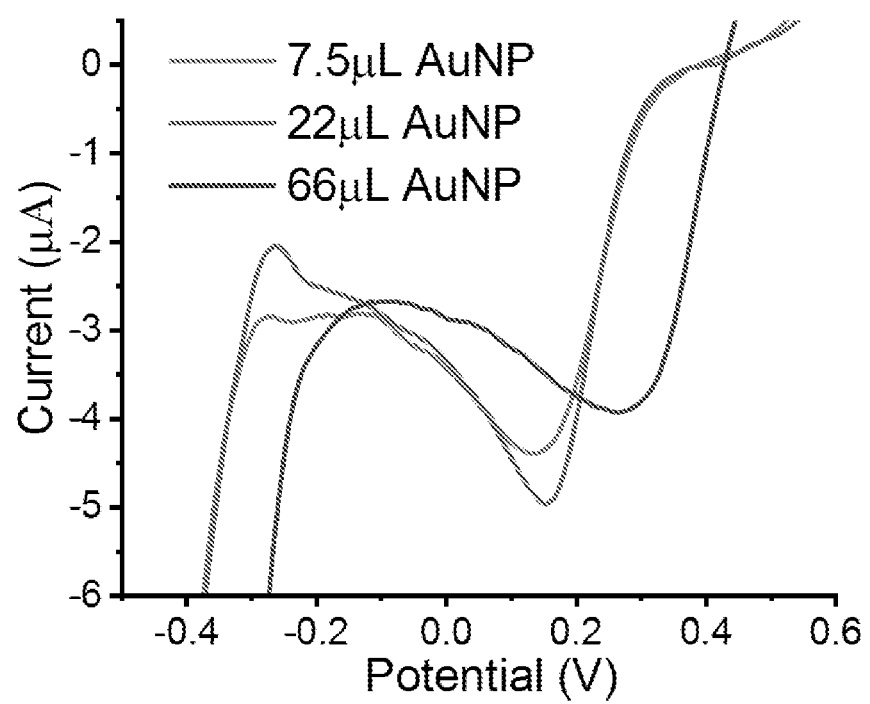

Example 21. Comparison of Chromium (VI) Detection with Respect to Gold Nanoparticles & Gold Nanostars Loading on the CPSPE Sensors were made according to Example 6. 3 ppm of Cr(VI), was prepared in water. These solutions were tested according to Example 8 using CPSPEs loaded with 7.5, 14.5, 22, 33, 49.5, 66 µL of gold nanoparticles (AuNP) or gold nanostars (AuNS) (FIGS. 31B and 31C show voltammograms for 7.5, 22, 66 µL for AuNS & AuNP respectively). For Cr(VI), the optimal AuNS and AuNP loading occurred at 33 µL. AuNS produced higher current outputs compared to AuNP for the same loading. From these results, AuNS produces higher current outputs at a certain loading range (15 µL to 50 µL) and therefore outperforms AuNP. Loading other than in the range of 15 µL to 50 µL results in lower current outputs, which may increase the limit of detection. The decrease in current output with increasing AuNS loading was discovered by coincidence while conducting tests at higher loading (concentrations) to achieve lower detection limits. Unexpectedly, it was observed that increasing the loading beyond a certain concentration actually degraded the detection. FIG. 31A is a graph showing peak heights for 3 ppm Cr(VI) with respect to AuNS and AuNP loading on the CPSPE.

REFERENCES

[1] Bradham, K. D., K. G. Scheckel, C. M. Nelson, P. E. Seales, G. E. Lee, M. F. HUGHES, B. W. Miller, A. YEOW, T. Gilmore, S. L. Harper, AND D. J. Thomas. Relative Bioavailability and Bioaccessability and Speciation of Arsenic in Contaminated Soils. Environmental Health Perspectives. 119(11):1629-1634, (2011).

[2] United States Environmental Protection Agency (USEPA). (1996). Soil screening guidance: Technical backgrounddocument. Washington D. C.: EPA, Office of Solid Waste and Emergency Response.

[3] United States Environmental Protection Agency (USEPA) (2007a). Microwave assisted acid digestion of sediments, sludges, soils and oils-Method 3050-SW-846, 1994a. Available in: http://www.epa.gov/epaosver/hazwaste/test/3050.pdf. Accessed 11 Dec. 2010.

[4] United States Environmental Protection Agency (USEPA) (2007b). Microwave assisted acid digestion of sediments, sludges, soils and oils-Method 3051-SW-846, 1994b. Available in: http://www.epa.gov/epaosver/hazwaste/test/3051.pdf. Accessed 11 Dec. 2010.

[5] United States Environmental Protection Agency (USEPA)(2007c). Microwave assisted acid digestion of sediments, sludges, soils and oils-Method 3052-SW-846, 1994c. Available in: http://www.epa.gov/epaosver/hazwaste/test/3052.pdf. Accessed 11 Dec. 2010.

[6] USEPA, 1980, Methods for the Sampling and Analysis of Priority Pollutants in Sediments and Fish Tissue, USEPA, EPA-600/4-81-055

[7] Saverot, S., Geng, X., Leng, W., Vikesland, P. J., Grove, T. Z. and Bickford, L. R., 2016. Facile, tunable, and SERS-enhanced HEPES gold nanostars. RSC Advances, 6(35), pp. 29669-29673

[8] de Puig, H., Tam, J. O., Yen, C. W., Gehrke, L. and Hamad-Schifferli, K., 2015. Extinction coefficient of gold nanostars. The Journal of Physical Chemistry C, 119(30), pp. 17408-17415.

[9] Wang, Y., Laborda, E., Crossley, A. and Compton, R. G., 2013. Surface oxidation of gold nanoparticles supported on a glassy carbon electrode in sulphuric acid medium: contrasts with the behaviour of 'macro' gold. Physical Chemistry Chemical Physics, 15(9), pp. 3133-3136.

[10] Jian, J. M., Liu, Y. Y., Zhang, Y. L., Guo, X. S. and Cai, Q., 2013. Fast and sensitive detection of Pb2+ in foods using disposable screen-printed electrode modified by reduced graphene oxide. Sensors, 13(10), pp. 13063-13075.

[11] Wang, Y. C., Cokeliler, D. and Gunasekaran, S., 2015. Reduced graphene oxide/carbon nanotube/gold nanoparticles nanocomposite functionalized screen-printed electrode for sensitive electrochemical detection of endocrine disruptor bisphenol A. Electroanalysis, 27(11), pp. 2527-2536.

[12] Randviir, E. P. and Banks, C. E., 2013. Electrochemical impedance spectroscopy: an overview of bioanalytical applications. Analytical Methods, 5(5), pp. 1098-1115.

INCORPORATION BY REFERENCE; EQUIVALENTS

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. An electrochemical sensor comprising:
   a) a working electrode, the working electrode comprising:
      i) a graphene oxide layer on the working electrode;
      ii) carbon nanotubes (CNTs) disposed on the graphene oxide layer; and
      iii) gold nanostars disposed on the CNTs;
   b) a reference electrode; and
   c) a counter electrode.

2. The electrochemical sensor of claim 1, wherein the electrochemical sensor has a charge transfer resistance from about 0.2 kiloohm (kΩ) to about 1 kiloohm (kΩ).

3. The electrochemical sensor of claim 1, wherein the electrochemical sensor has a double layer capacitance from about 2 µF to about 5 µF.

4. The electrochemical sensor of claim 1, where working electrode comprises carbon paste, glassy carbon, gold, platinum, silver, or indium tin oxide (ITO) glass.

5. The electrochemical sensor of claim 1, wherein the working electrode comprises carbon paste.

6. The electrochemical sensor of claim 1, wherein about 80% of the gold nanostars have a diameter from about 15 nm to about 55 nm.

7. The electrochemical sensor of claim 1, wherein the gold nanostars have spike lengths from about 7 nm to about 33 nm.

8. A method for detecting a heavy metal in a sample by square wave anodic stripping voltammetry, the method comprising:
   a) depositing an analyte of interest onto a working electrode by applying a reducing potential;
   b) stripping the analyte of interest from the working electrode by applying an oxidizing potential;
   c) measuring current at the working electrode as a function of time and as a function of the potential between a counter electrode and a reference electrode while stripping the analyte of interest from the working electrode;
   d) varying the potential between the counter electrode and the reference electrode in a square wave pattern with an increasing potential;
   wherein the working electrode, reference electrode, and counter electrode form an electrochemical sensor of claim 1.

9. The method of claim 8, wherein the sample is aqueous media.

10. The method of claim 9, wherein the aqueous media is from a subsurface source of water.

11. The method of claim 10, wherein the subsurface source of water is tap water, well water, or ground water.

12. The method of claim 9, wherein the aqueous media is wastewater.

13. The method of claim 8, wherein the sample is a biological fluid.

14. The method of claim 13, wherein the biological fluid is blood.

15. A method of making an electrochemical sensor, the method comprising:
   a) providing a substrate comprising a working electrode, a reference electrode, and a counter electrode;
   b) forming a layer of graphene oxide on the working electrode;
   c) forming a layer of carbon nanotubes (CNTs) on the layer of graphene oxide; and
   d) forming a layer of gold nanostars on the layer of CNTs.

16. The method of claim 15, wherein one or more of the layer of graphene oxide, the layer of CNTs, and the layer of gold nanostars is formed by drop casting.

17. The method of claim 15, wherein one or more of the layer of graphene oxide, the layer of CNTs, and the layer of gold nanostars is formed by electrodeposition.

18. The method of claim 15, where the working electrode comprises carbon paste, glassy carbon, gold, platinum, silver, or indium tin oxide (ITO) glass.

19. The method of claim 15, where working electrode comprises carbon paste.

20. The method of claim 15, wherein about 80% of the gold nanostars have a diameter from about 20 nm to about 45 nm.

21. The method of claim 15, wherein the gold nanostars have spike lengths from about 7 nm to about 33 nm.

22. The method of claim 15, further comprising forming gold nanostars by:
   a) providing a chloroauric acid solution;
   b) heating the chloroauric acid solution;
   c) cooling the heated chloroauric acid solution; and
   d) combining the cooled chloroauric with a buffered base.

23. The method of claim 22, further comprising homogenizing the chloroauric acid solution prior to heating the chloroauric acid solution.

24. The method of claim 22, wherein the buffered base comprises 4-(2-hydroxyethyl)-1-piperazineethanesulfonic acid (HEPES).

25. The method of claim 22, wherein the buffered base comprises sodium hydroxide (NaOH).

26. The method of claim 22, wherein the buffered base comprises 4-(2-hydroxyethyl)-1-piperazineethanesulfonic acid (HEPES) and sodium hydroxide (NaOH).

* * * * *